United States Patent [19]
Anderson et al.

[11] Patent Number: 5,586,082
[45] Date of Patent: Dec. 17, 1996

[54] METHOD FOR IDENTIFYING SUBSURFACE FLUID MIGRATION AND DRAINAGE PATHWAYS IN AND AMONG OIL AND GAS RESERVOIRS USING 3-D AND 4-D SEISMIC IMAGING

[75] Inventors: Roger N. Anderson; Albert Boulanger, both of New York, N.Y.; Edward P. Bagdonas, Brookline, Mass.; Liqing Xu; Wei He, both of New Milford, N.J.

[73] Assignee: The Trustees of Columbia University in the City of New York, New York, N.Y.

[21] Appl. No.: 398,371

[22] Filed: Mar. 2, 1995

[51] Int. Cl.$^6$ ............................... G01V 1/13; G01V 1/28
[52] U.S. Cl. ............................... 367/73; 367/38; 367/59; 364/421
[58] Field of Search ................... 367/37, 38, 59, 367/73; 364/421; 382/22

[56] References Cited

U.S. PATENT DOCUMENTS

| | | |
|---|---|---|
| 3,697,938 | 10/1972 | Taner. |
| 3,885,225 | 5/1975 | Anstey et al.. |
| 3,898,610 | 8/1975 | Pennebaker, Jr.. |
| 4,072,922 | 2/1978 | Taner et al.. |
| 4,259,733 | 3/1981 | Taner et al.. |
| 4,363,113 | 12/1982 | Taner et al.. |
| 4,479,204 | 10/1984 | Silverman. |
| 4,821,164 | 4/1989 | Swanson. |
| 4,969,130 | 11/1990 | Wason et al.. |
| 5,018,112 | 5/1991 | Pinkerton et al. ............... 367/73 |
| 5,235,556 | 8/1993 | Monk et al.. |
| 5,311,484 | 5/1994 | Anderson et al.. |

FOREIGN PATENT DOCUMENTS

| | | |
|---|---|---|
| 933401 | 2/1993 | WIPO. |

OTHER PUBLICATIONS

I. Pitas, A. N. Venetsanopoulos, "Knowledge–Based Image Analysis for Geophysical Intrepretation," *Journal of Intelligent and Robotic Systems*, 7:115–137, 1993.

"Segmentation," *Encyclopedia of Artificial Intelligence*, vol. 2 M–Z, Second Edition, pp. 1473–1491, 1992.

(List continued on next page.)

*Primary Examiner*—Nelson Moskowitz
*Attorney, Agent, or Firm*—Brumbaugh, Graves, Donohue & Raymond

[57] ABSTRACT

The invention utilizes 3-D and 4-D seismic surveys as a means of deriving information useful in petroleum exploration and reservoir management. The methods use both single seismic surveys (3-D) and multiple seismic surveys separated in time (4-D) of a region of interest to determine large scale migration pathways within sedimentary basins, and fine scale drainage structure and oil-water-gas regions within individual petroleum producing reservoirs. Such structure is identified using pattern recognition tools which define the regions of interest. The 4-D seismic data sets may be used for data completion for large scale structure where time intervals between surveys do not allow for dynamic evolution. The 4-D seismic data sets also may be used to find variations over time of small scale structure within individual reservoirs which may be used to identify petroleum drainage pathways, oil-water-gas regions and, hence, attractive drilling targets. After spatial orientation, and amplitude and frequency matching of the multiple seismic data sets, High Amplitude Event (HAE) regions consistent with the presence of petroleum are identified using seismic attribute analysis. High Amplitude Regions are grown and interconnected to establish plumbing networks on the large scale and reservoir structure on the small scale. Small scale variations over time between seismic surveys within individual reservoirs are identified and used to identify drainage patterns and bypassed petroleum to be recovered. The location of such drainage patterns and bypassed petroleum may be used to site wells.

19 Claims, 17 Drawing Sheets

Microfiche Appendix Included
(5 Microfiche, 129 Pages)

OTHER PUBLICATIONS

E. A. Breitenbach, G. A. King, K. N. B. Dunlop, "The Range of Application of Reservoir Monitoring," SPE 19853, 1989.

K. N. B. Dunlop, G. A. King, E. A. Breitenbach, "Monitoring of Oil/Water Fronts by Direct Measurement," SPE 18271, 1988.

Milton B. Dobrin, Carl H. Savit, *Introduction to Geophysical Prospecting,* Fourth Edition, 1988.

William E. Lorensen, Harvey E. Cline, "Marching Cubes: A High Resolution 3D Surface Construction Algorithm," *Computer Graphics,* vol. 21, No. 4, Jul. 1987.

Amos M. Nur, "Seismic Imaging in Enhanced Recovery," SPE/DOE 10680, 1982.

N. A. Anstey, *Simple Seismics,* 1982.

M. T. Taner, F. Koehler, R. E. Sheriff, "Complex Seismic Trace Analysis," *Geophysics,* vol. 44, No. 6 (Jun. 1979), pp. 1041–1063.

Anderson et al, Oil Gas Journal, vol. 93, #13, pp. 55–58, Mar. 27, 1995.

Anderson et al, AAPG Bull., vol. 80, #4, pp. 453–459, Apr. 1996.

Anderson et al, 5th Annu. SPE et al Archie Conf., May 14, 1995, Proc. 1995. 1 pg.

He et al, Annu. AAPG–SEPM–EMD–DPA–DEG Conv., Mar. 5, 1995, p. 41A.

Anderson et al., Oil Gas Journ., V93, #14, pp. 70–74, Apr. 3, 1995.

Anderson et al, Annu. AAPG–SEPM–EMD–DPA–DEG Conf., May 19, 1996, A4. (AN626529).

Anderson et al, Ann. AAPG–SEPM–EMD–DPA–DEG Conf., May 19, 1996, A4 (AN 626522).

Breitenbach, E. A., 62nd Annu. SEG Mtg, Oct. 25, 1992, p. 600.

METHOD FOR IDENTIFYING SUBSURFACE FLUID MIGRATION AND DRAINAGE PATHWAYS IN AND AMONG OIL AND GAS RESERVOIRS USING 3-D AND 4-D SEISMIC IMAGING

The U.S. Government has a paid-up license in this invention and the rights in limited circumstances to require the patent owner to license others on reasonable terms as provided for by the terms of Contract No. DE-FC22-93BC14961 awarded by the Department of Energy.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

A microfiche Appendix containing source code listing utilized in practicing the invention is included as part of the Specification and is hereinafter referred to as Appendix I. Appendix I includes five microfiche, labeled orient_seismic.c, median_filter.c, grow_region.c, res_builder.c and fluid_migration.c, with 17, 14, 18, 51 and 29 frames respectively.

BACKGROUND OF THE INVENTION

The present invention relates to identifying and mapping subsurface fluid flow structure which may be particularly useful in analyzing the evolution of underground petroleum and natural gas reserves in large scale basins and small scale reservoirs, and their migration and drainage networks. Such information is of great interest to the petroleum industry and may be used to site wells for maximum recovery.

Most major hydrocarbon producing basins of the world have deep stratigraphic layering and structures that may be mapped using well log data and/or seismic imaging. Hydrocarbon reservoirs are embedded within such stratigraphic layers. These hydrocarbon reservoirs must be interconnected by migration pathways that lead to fluid sources deep within the earth. Further, the individual reservoirs experiencing production must have finescale drainage structure over which short term variations (e.g., 1–10 years) in hydrocarbon signals should be observable.

At the large scale (entire sedimentary basin regions) it would be useful to identify the interconnectivity between hydrocarbon reservoirs and migration pathways. At the small scale (individual producing reservoirs) it would be useful to identify high porosity drainage structure, regions of bypassed pay and gas-oil-water volumes. Robust methodology is required to identify these structures both at the basin scale and at the reservoir scale such that variations in multiple seismic surveys may be exploited and the derived geometry of the regions of interest will be stable among surveys.

In the prior art, two dimensional (2-D) seismic reflection profiles and three dimensional (3-D) seismic surveys have been used to predict the location of oil and gas reservoirs and to site wells. Typically, well-dependent log analysis techniques then locate the specific production intervals within each well. Seismic surveying produces geological imaging of the subsurface determined from the acoustic signature recorded at the top surface of a volume of earth. A typical seismic survey covers a volume of several tens of cubic kilometers. In 3-D seismic surveys, the geological formations and structures within the earth are determined from overlapping energy ensonifications (acoustic reflections) within that volume. The basics of seismic analysis may be found, for example, in "Simple Seismics," N. A. Anstey, International Human Resources Development Corp., 1982.

Previous work in identifying hydrocarbon reservoirs from seismic surveys have employed seismic attribute analysis to identify subsurface features consistent with the presence of oil or gas. Seismic attribute analysis typically involves complex-valued signal analysis of seismic waveforms. The seismic features consistent with the presence of petroleum are often referred to as "Bright Spots," and are herein referred to as "High Amplitude Regions." For example, U.S. Pat. No. 4,479,204 to Silverman discusses the association of Bright Spots with subsurface oil or gas reservoirs.

High Amplitude Regions may be identified using a variety of seismic attributes. It is well known, for example, that complex trace analysis may be performed on reflection seismic traces to derive reflection strength, instantaneous phase, instantaneous amplitude and other seismic attributes. An exemplary discussion of this analysis may be found in M. T. Taner et al., "Complex Seismic Trace Analysis," Geophysics, Vol. 44, No. 6, pp. 1041–63 (June 1979). These seismic attributes can often be associated with the presence of oil or gas deposits. For example, a change in the reflection strength and/or instantaneous phase attributes is often observed across the top of oil or gas reservoirs.

Techniques as discussed in Taner et al. for using the complex trace analysis on seismic reflection traces and examining the attributes of such traces, have the shortcoming of not providing reliable mapping of drainage features within individual reservoirs. The trace attributes utilized by Taner et al. have high frequency components that may not effectively identify the physical structure of interest. Small scale structure should not be inferred from the high frequency components because extraction of any such information is not justified by the wavelength of seismic energy, typically about 75 feet.

It has been found that the use of smoothed or envelope information of the seismic traces yields more reliable information regarding true physical structure. As described in U.S. Pat. No. 5,311,484 to Anderson and He (hereinafter "Anderson and He"), incorporated in full herein by reference, the geopressure transition zone in the Gulf Coast of offshore Louisiana, for example, is between 100 and 1,000 feet thick, and the trend of the transition zone may be more precisely identified by use of a smoothed reflection strength trace. Complex trace analysis is preformed on the instantaneous amplitude trace to obtain the "second reflection strength," which is effectively the envelope of the instantaneous amplitude utilized by Taner et al. This second reflection strength has been found to better map top-of-geopressure surfaces, as in Anderson and He, in that broad trends may be identified. The second reflection strength is also a valuable seismic attribute for identifying regions containing hydrocarbons in that spurious high frequency data is eliminated due to the processing of the trace in calculating the second reflection strength.

Significantly, hydrocarbon reservoirs are not acoustically static over their history due to production therefrom or natural drainage processes. The location and content of oil or gas reservoirs changes substantially due to natural drainage and production of water, oil and gas. Additionally, the seismic attribute imaging of the prior art is highly sensitive to the methodology and processing involved in each seismic survey, and thus even large scale static features cannot be faithfully reproduced over two or more spatially overlapping surveys. Accordingly, the prior art which processes single surveys is incapable of accurately tracking and identifying the interconnectivity and drainage history of regions containing hydrocarbons. Multiple 3-D seismic surveys taken at different times, or four dimensional (4-D) surveys, over both large scale basins and within small scale reservoirs can yield vital information for assessing prospective well target locations in hydrocarbon prospecting, by better defining large scale structure and allowing for the analysis of changes in small scale regions by differencing 3-D data sets.

It is expected that fine scale drainage structure within reservoirs should be observable upon differencing seismic data taken at different times of the High Amplitude Regions of a reservoir of interest. For several years, laboratory measurements of the changes in acoustic reflection coefficients caused by changes in oil, gas, water and effective pressure have been predicting that field monitoring of enhanced recovery processes such as water and stream floods should produce mappable acoustic differences over time within a given reservoir. See, e.g., Nur, "Seismic Imaging in Enhanced Recovery," SPE Paper 10680, 1982. Successful field monitoring of oil/water boundary movements during waterfloods have been carried out in several fields worldwide (see, Breitenbach et al., "The Range of Applications of Reservoir Monitoring," SPE Paper 19853, 1989; and Dunlop et al., "Monitoring of Oil/Water Fronts by Direct Measurements," SPE Paper 18271, 1988) utilizing the physical principles determined in the laboratory. In locations such as the Gulf of Mexico, where the impedance contrasts of lithologies versus fluid mixes are sufficiently large, 4-D (multiple 3-D surveys over time) seismic monitoring can define drainage and gas-oil-water boundary movements. Such analysis has not been accomplished in the prior art.

Two major seismic amplitude changes can occur over time periods of interest (i.e., 1–10 years between surveys) in hydrocarbon producing reservoirs. These changes work in tandem with a general decrease in seismic amplitude that occurs due to the increase in differential pressure (lithostatic minus formation fluid pressure) as hydrocarbons are drained from a reservoir. One change is known as a "dim-out," which is caused by the replacement of oil with water. This causes a marked decrease in seismic amplitude which augments the overall decrease in seismic amplitude due to increased differential pressure. The second change is caused by the formation of a gas cap which occurs when gas comes out of solution from the oil as reservoir pressure drops upon production. A gas cap results in a very marked increase in seismic amplitude which overcomes the decrease that occurs due to increased differential pressure. Accordingly, despite the overall trend in decreasing seismic amplitude that occurs due to increased differential pressure caused by production, the dim-out and gas cap phenomena are believed to allow the segregation of oil, water and gas seismic signals and, thus, allow identification of fluid boundaries and drainage within a High Amplitude Region within a reservoir. It may be expected that within a reservoir of interest, differenced survey data of the hydrocarbon bearing reservoir from two or more periods should show clearly segregated regions of water, oil and gas, including drainage structure. High porosity regions with bypassed oil and gas (pay) which experience little change in differential pressure, can be identified as regions of near zero change in amplitude within a High Amplitude Region over time. These areas of high porosity may correlate with the drainage pathways within a reservoir which will be highly attractive well sites for the future discovery of bypassed pay. Such pathways have never been seismically imaged by the prior art.

SUMMARY OF THE INVENTION

The present invention overcomes the shortcomings of the prior art by providing a method whereby large scale hydrocarbon pathways and small scale reservoir drainage patterns can be mapped within a seismically defined volume of the subsurface over time through the analysis of multiple 3-D seismic surveys acquired over the same volume of the earth at different times. The invention utilizes feature extraction operators which identify multiple-survey-registered areas of High Amplitude Regions which indicate oil and gas locations within the subsurface volume, and the inter and intra connectivity thereof. For large scale basins, the invention uses multiple seismic surveys to image static reservoir locations and inter reservoir hydrocarbon migration pathways, which register as High Amplitude Regions. For small scale reservoirs the methodology described uses seismic differences calculated after common features of interest have been identified in the multiple surveys, and images attribute variations within High Amplitude Regions to determine the structure and drainage pathways within a single hydrocarbon reservoir.

The feature extraction methodology wherein High Amplitude Regions are identified is robust in the sense that the final derived geometry of the region of interest is insensitive to the signal quality and ensonification variations that are inevitably present in different seismic surveys. The segmentation process of "region-growing" combined with the application of a median filter lead to this robustness.

On the reservoir scale, the 4-D seismic methodology is used to identify variations in the reservoir contents and drainage paths by differencing the data over the time intervals between surveys. For the large scale basin regions, identification of interconnectivity between reservoirs and migration paths can make use of single or multiple seismic surveys. At the larger spatial resolution, for the time scale between surveys, there is little or no large scale fluid movement that can be identified by using seismic differences between surveys. Instead, the history of the migration paths is preserved in the residual oil amounts present within the pathways. However, tracking these migration pathways from known reservoirs to source can lead to the discovery of new pay. While the raw seismic amplitudes within these migration pathways may not always identify them as High Amplitude Regions outright, the amplitudes are high enough for the region-growing method herein described to follow, extend and connect the High Amplitude Regions within the sedimentary basin region being imaged. The multiple surveys at this larger scale can be used to supplement any missing or poorly ensonified (acoustically represented) regions in one survey.

Thus, multiple seismic surveys are useful both for 4-D reservoir scale analysis and for data completion for larger scale basin analysis. For the 3-D seismic surveys to show recognizable dynamic evolution at the reservoir scale, the surveys should be separated in time by a period which allows for recognizable dynamic evolution at the small scale. For the exemplary embodiment, wherein the South Addition Eugene Island region of the offshore Gulf of Mexico was imaged, the surveys utilized occurred in 1985, 1988 and 1992, and an appropriate time scale between surveys is thought to be of order one to ten years.

The basic steps of the methodology of the invention are as follows. The first step involves acquiring multiple seismic surveys of a volume of interest. The multiple surveys are subsequently processed to be spatially coincident, and have the same resolution and orientation. The frequency and amplitude values of the surveys are matched to ensure meaningful comparisons for 4-D differencing analysis. The seismic attribute determined to be indicative of hydrocarbon deposits is identified and computed for the entire survey volume. In the exemplary embodiment, the second reflection strength of Anderson and He is chosen as the seismic attribute indicative of High Amplitude Regions. If the data is not sufficiently smooth, i.e., sufficient connectivity between High Amplitude Regions cannot be attained, the seismic attribute data may be run through a median filter or other smoothing process. The High Amplitude Regions are then grown from high amplitude seed points identified within the survey. The region growing operator extracts large scale structure from analysis of local data.

Once the High Amplitude Regions have been identified, the method of the invention differs depending on whether small scale reservoirs or large scale basin regions are being analyzed. For the large scale basin regions, an outer shell of the plumbing network identified as the High Amplitude Region is extracted. This allows visualization of the large scale migration pathways and reservoir location within the entire basin region. Advection simulation of hydrocarbons moving within the shell may follow wherein it is confirmed that the identified shell allows petroleum to migrate from sources deep within the earth, to and among the identified reservoirs.

Analysis within the small scale reservoirs following region growing takes on a time dependent dimension. After the High Amplitude Region within the reservoir of interest is "grown" for each survey, the inter survey seismic data representing the High Amplitude Regions within reservoirs are differenced. The overall geometry of the High Amplitude Region of the reservoir remains stable between surveys due to the robust region growing method, median filtering and short time scale between surveys. Thus, identified variations or lack thereof may be identified as drainage pathways or areas of bypassed pay within small scale reservoirs. The location of porous drainage pathways and regions of bypassed pay are excellent well sites for petroleum prospecting.

BRIEF DESCRIPTION OF THE DRAWINGS

Exemplary embodiments in accordance with the present invention will now be described with reference to the accompanying drawings, in which.

DETAILED DESCRIPTION

Figure 1A:
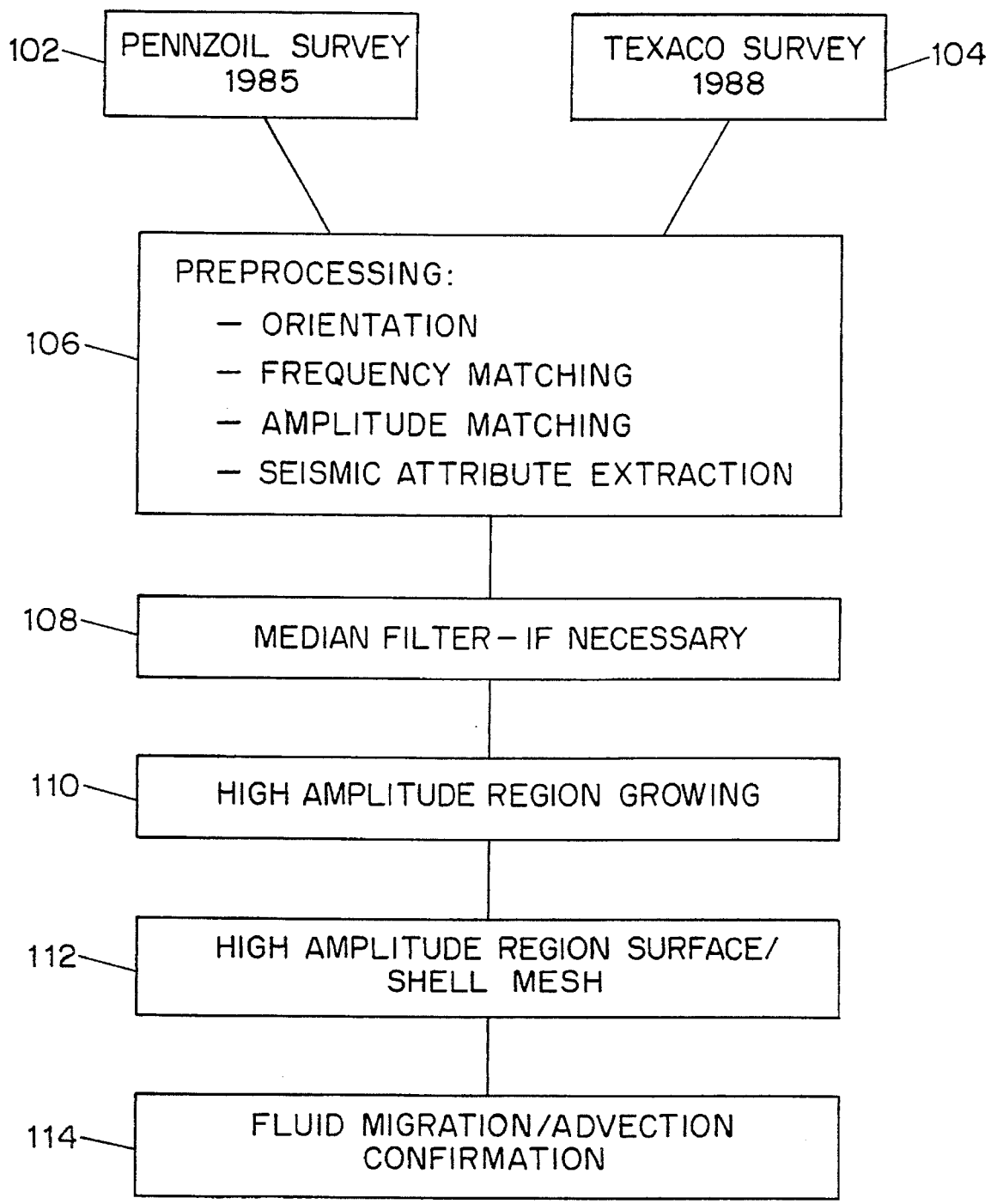
FIGS. 1(A) and 1(B) are block diagrams showing the flow of the basic steps involved in carrying out the methodology of the invention for analysis of large scale basin regions and small scale reservoirs, respectively.
Figure 1B:
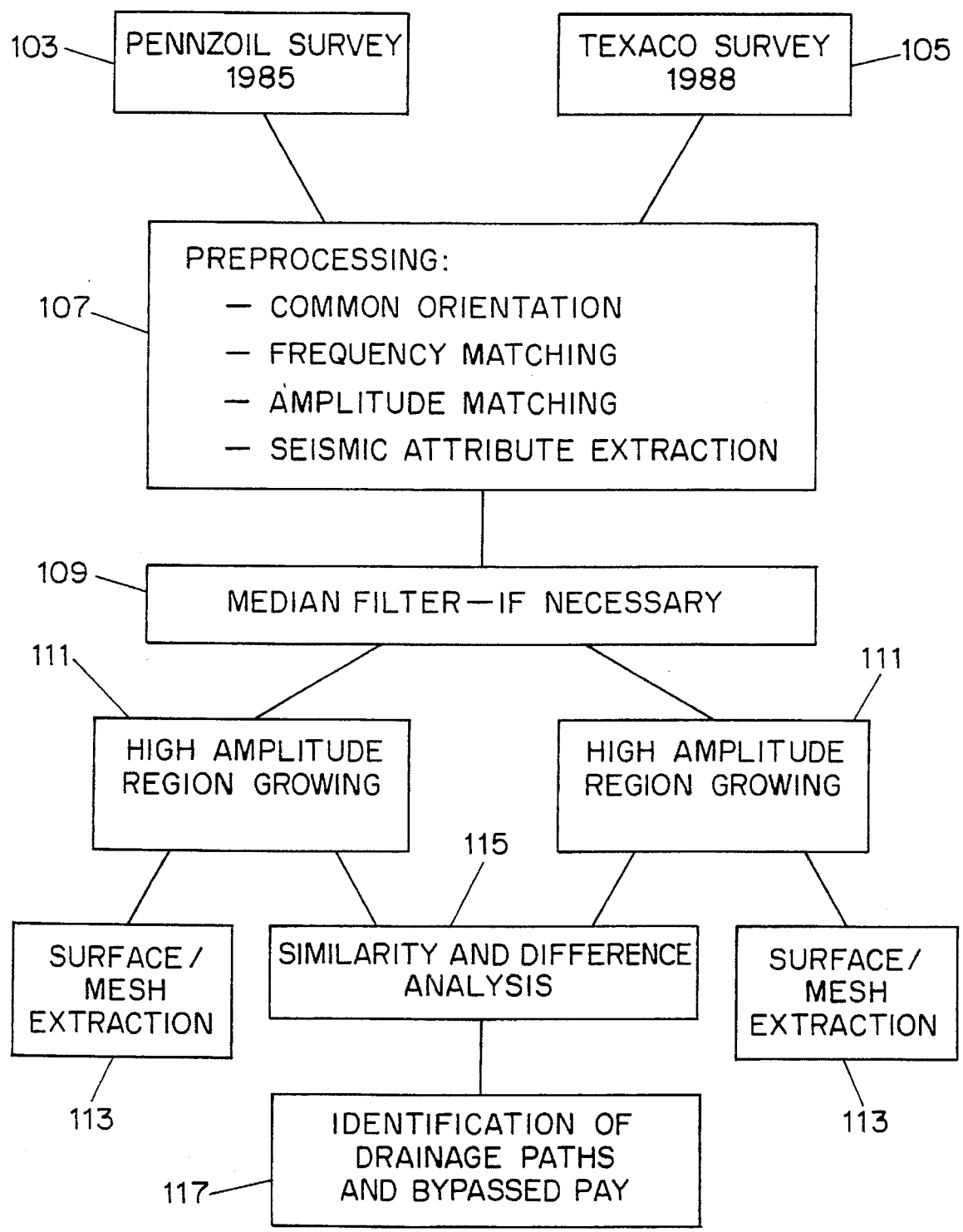

Referring now to FIGS. 1(A) and 1(B), there are shown flow diagrams noting the basic steps involved in carrying out the invention herein described. FIG. 1(A) shows the steps involved in identifying large scale migration pathways and reservoirs within sedimentary basins. FIG. 1(B) shows the steps involved in identifying small scale drainage patterns and bypassed pay within individual reservoirs. The method disclosed will be useful for petroleum exploration and reservoir development strategies in hydrocarbon producing sedimentary regions such as the Gulf of Mexico, Nigeria, the North Sea, the Caspian Sea, Indonesia, etc.—especially those regions that have multiple generations of 3-D seismic surveys.

Figure 2:
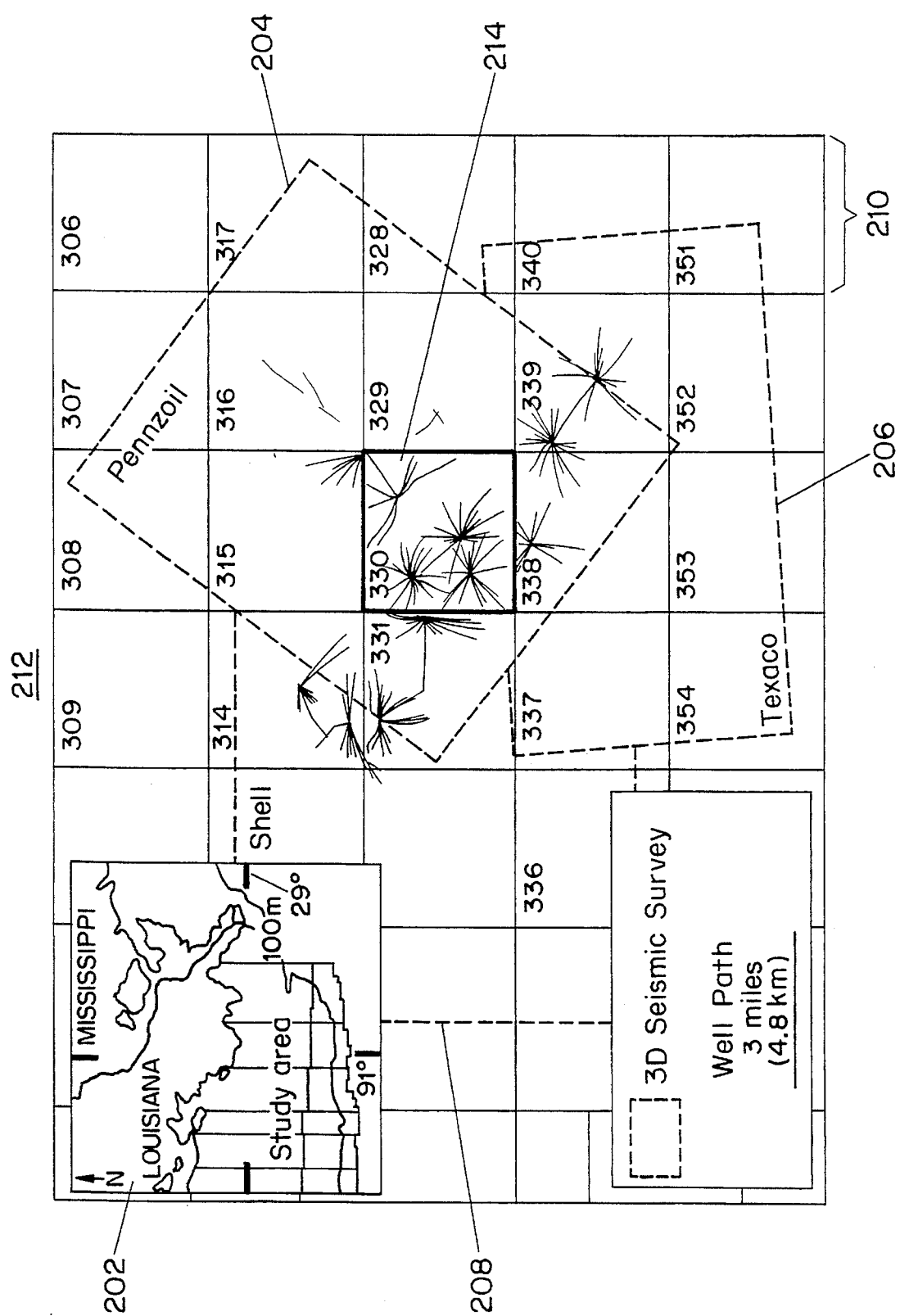
FIG. 2 is a map of the seismic survey regions studied in carrying out the exemplary embodiment.

For the exemplary embodiment, seismic surveys of the sedimentary basin associated with the Eugene Island South Addition area in the offshore Gulf of Mexico region south of Louisiana were used. The general location (202) of the region of interest is shown in FIG. 2. Also shown in FIG. 2 are the survey boundaries of the 1985 Pennzoil seismic survey (204), the 1988 Texaco seismic survey (206) and the 1992 Shell seismic survey (208). In presenting the enabling disclosure, only data from the 1985 Pennzoil and 1988 Texaco surveys were used. However, the methodology of the exemplary embodiment has been verified using the 1992 Shell survey as well. There is, of course, no limit to the number of surveys which can be analyzed in accordance with the disclosed invention. The grid size (210) shown in FIG. 2 are squares approximately 3 miles on each side.

Returning to FIG. 1(A), the 1985 Pennzoil data (102) and 1988 Texaco data (104) are preprocessed as represented in box (106). The preprocessing steps (106), described in greater detail below, involve spatial orientation and regridding of the two surveys, frequency and amplitude matching of the data, and seismic attribute analysis of the data to identify features consistent with the presence of oil and gas. In the exemplary embodiment, the seismic attribute utilized is the second reflection strength pursuant to Anderson and He. The invention, however, is not limited to analysis of only this seismic attribute, the use of the instantaneous amplitude, frequency phase, and the like, is also envisioned.

For data samples that are noisy in the sense that High Amplitude Regions are not easily connected when the data is processed in accordance with the invention, the seismic attribute data may be run through a median filter (108) or be processed by another known smoothing technique. The median filter described in further detail below, replaces the seismic amplitude value at each point of the sample with the median value of all direct neighboring points within the survey. This has the effect of smoothing the data and enhancing connectivity as the data is further processed according to the invention.

The seismic amplitude data reflecting either the raw second reflection strength or the smoothed amplitude values after processing by the median filter, is processed by utilizing a region growing technique. The region growing methodology (110) utilized in the preferred embodiment and described in greater detail below, processes local data in deriving global characteristics of High Amplitude Regions. Seed points of high amplitude signals are chosen and the entire High Amplitude Regions are grown from those seed points by identifying all neighboring points above a certain threshold in amplitude. The resulting configuration of all identified high amplitude data will represent the geometry of the High Amplitude Region which may be correlated with the presence of hydrocarbons.

Once the High Amplitude Region is identified, the invention allows for an outer surface of the High Amplitude Region to be extracted (112), as described in greater detail below. The outer surface of the region is identified and meshed to allow three dimensional visualization of the High Amplitude Region. Hydrocarbon reservoirs and inter reservoir migration paths associated with the High Amplitude Region may thus be directly imaged.

Finally, the exemplary embodiment provides for confirmation of the physical viability of the derived geometry by modeling fluid migration and advection within the derived geometry. Petroleum samples are made to follow an upward biased random walk trajectory to simulate buoyancy to confirm that oil and gas can in fact migrate within the derived plumbing shell.

Referring now to FIG. 1(B) which shows the steps involved in identifying features within individual small scale reservoirs, the initial steps are the same as in the analysis of the larger scale features. The 1985 Pennzoil survey (103) and 1988 Texaco survey (105) data are obtained and preprocessed (107) to ensure common orientation and gridding. The data are then frequency and amplitude matched and the second reflection strength amplitude calculated throughout each survey. Although use of a median filter (109) is available, the data within the reservoir of interest in the exemplary embodiment (the "LF Reservoir," Eugene Island Blocks 330/338) was sufficiently noise free to skip this median processing step. The region growing (111) then occurs only over the data covering the small scale reservoir of interest, i.e., High Amplitude Regions are not grown over the entire basin when analyzing individual reservoirs. An outer shell of the reservoir may then be meshed according to step 113. While variations in small scale drainage structure are discernable between 1985 and 1988, due to the robust region growing methodology and short time scale between surveys, no significant shift in the outer shell was identified for the LF Reservoir.

Once the High Amplitude Regions are grown for the multiple surveys, differencing analysis of the High Amplitude Regions may be performed on the data sets (115). Analysis of the differences within these High Amplitude Regions between surveys leads to the identification of hydrocarbon drainage paths, regions of bypassed pay, and gas-oil-water volumes (117) as described in greater detail below. These drainage paths and areas of bypassed pay are prime well sites for hydrocarbon prospecting.

Preprocessing

As described in this preferred embodiment, the volume seismically imaged overlaps the Eugene Island Block 330 Field of the United States federal leasehold in the Northern Gulf of Mexico. FIG. 2 shows a general map (202) of the area of interest and a higher resolution grid (212) of the field. The seismic data was obtained from various corporate sponsors of the research which resulted in the present disclosure. FIG. 2 shows the general surface extent and orientation of the 1985 Pennzoil survey (204), the 1988 Texaco survey (206) and the 1992 Shell survey (208). Each survey is shown to overlap the 330 Field of interest (214). The surveys used are summarized below:

3-D Seismic Data Set 1:

Date of survey—March, 1985

Origin of survey—Halliburton Geophysical Services

Orientation of survey—Northwest-Southeast

X Resolution of survey (ft)—41'

Y Resolution of survey (ft)—82'

Z Resolution of survey (ms)—4 ms to 6 sec

Source—airgun array

Post Processing—Minimum Phase, 3-D Dip Move Out Migration by Western Geophysical in 1992.

3-D Seismic Data Set 2:

Date of survey—October, 1987–March, 1988

Origin of survey—Western Geophysical

Orientation of survey—East-West

X Resolution of survey (ft)—41'

Y Resolution of survey (ft)—61'

Z Resolution of survey (ms)—4 ms to 6 sec

Source—airgun array

Post Processing—Zero Phase, 3-D Dip Move Out Migration by Texaco.

3-D Seismic Data Set 3:

Date of survey—Summer, 1992

Origin of survey—S/V Shell America

Orientation of survey—North-South

X Resolution of survey (ft)—75'

Y Resolution of survey (ft)—50'

Z Resolution of survey (ms)-4 ms to 9 sec

Source—airgun array

Post Processing—Shell Processing Center, Houston, Tex.

Naturally, the data sets acquired reflect a variety of orientations, source frequencies, starting times, etc. However, they may be cropped and interpolated to be spatially coincident as further described below. Dynamic range will also typically vary from data set to data set. These variations are most likely due to seismic acquisition and/or variations in post processing technology. For example, the impulse source, filtering techniques, pre- and post-stack migration levels may vary from one data set to the next. It is merely necessary that these variations be known to allow amplitude and frequency matching of the various data sets.

The techniques utilized in acquiring reflection seismic data on land and offshore, and for deriving stacked and migrated relative seismic traces from raw seismic data are well known and described, for example, in Dobrin and Savit, "Introduction to Geophysical Prospecting," Fourth Edition, McGraw-Hill Book Co. (1988).

Figure 3A:
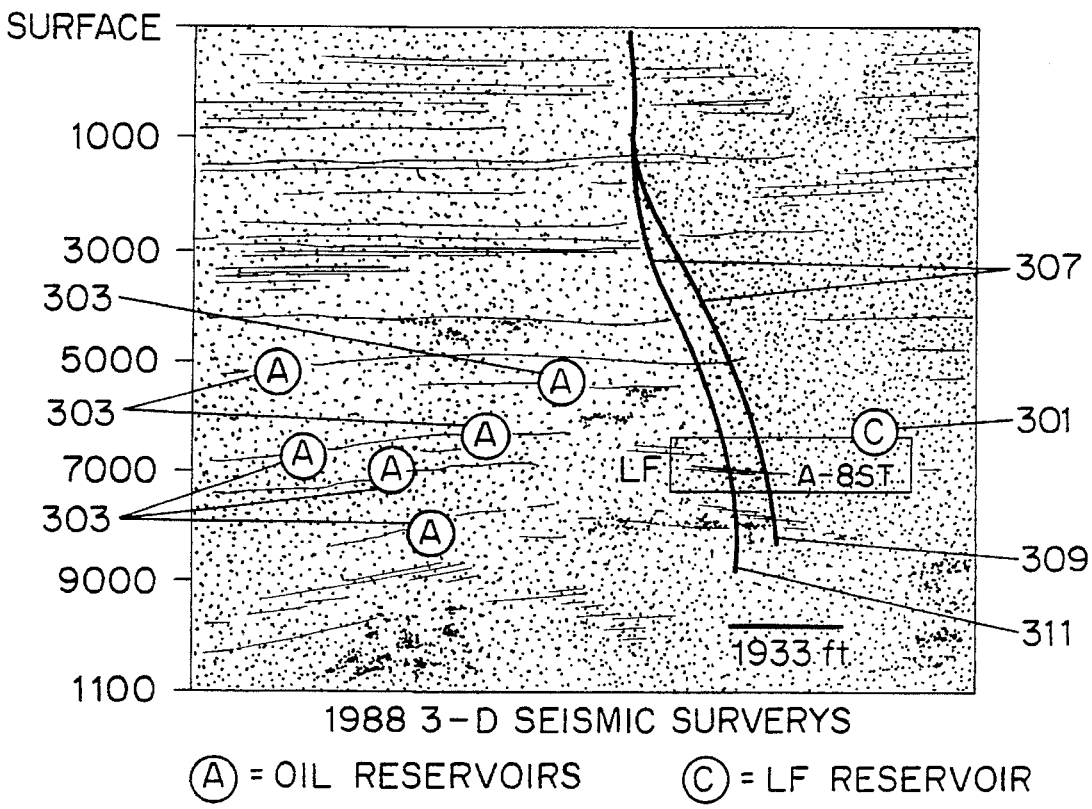
FIGS. 3(A) and 3(B) show corresponding two dimensional seismic reflection profiles from the region of interest from the 1985 Pennzoil and 1988 Texaco surveys.
Figure 3B:
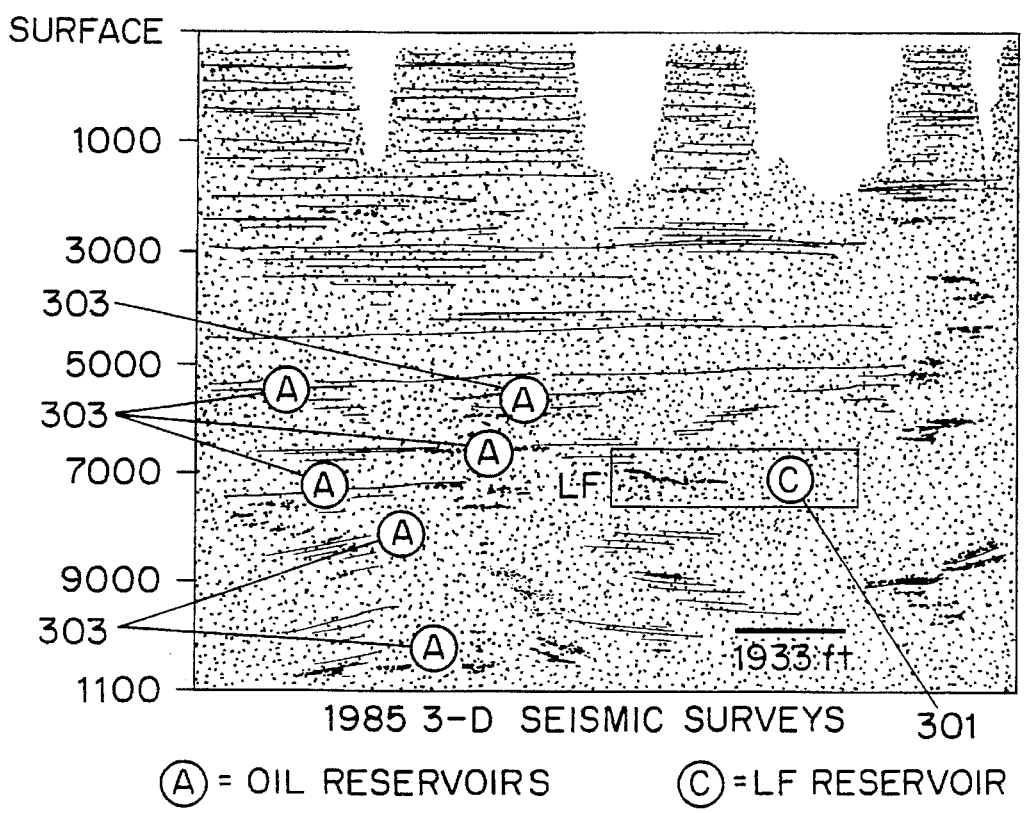

Exemplary stacked and migrated seismic reflection profiles are shown in FIGS. 3(A) and 3(B). FIGS. 3(A) and 3(B) are 2-D reflection profiles mapping vertical slices of the region of interest near the 330/338 border (216) shown in FIG. 2. FIG. 3(A) represents the data from the 1988 Texaco survey and FIG. 3(B) is the same slice as shown in the 1985 Pennzoil survey. Both surveys show the LF Reservoir (301) imaged in this enabling disclosure. Both surveys also show common areas of oil (303) trapped within sandstone formations. The 1988 survey also shows the approximate trajectory of various existing well paths (307).

Figure 5:
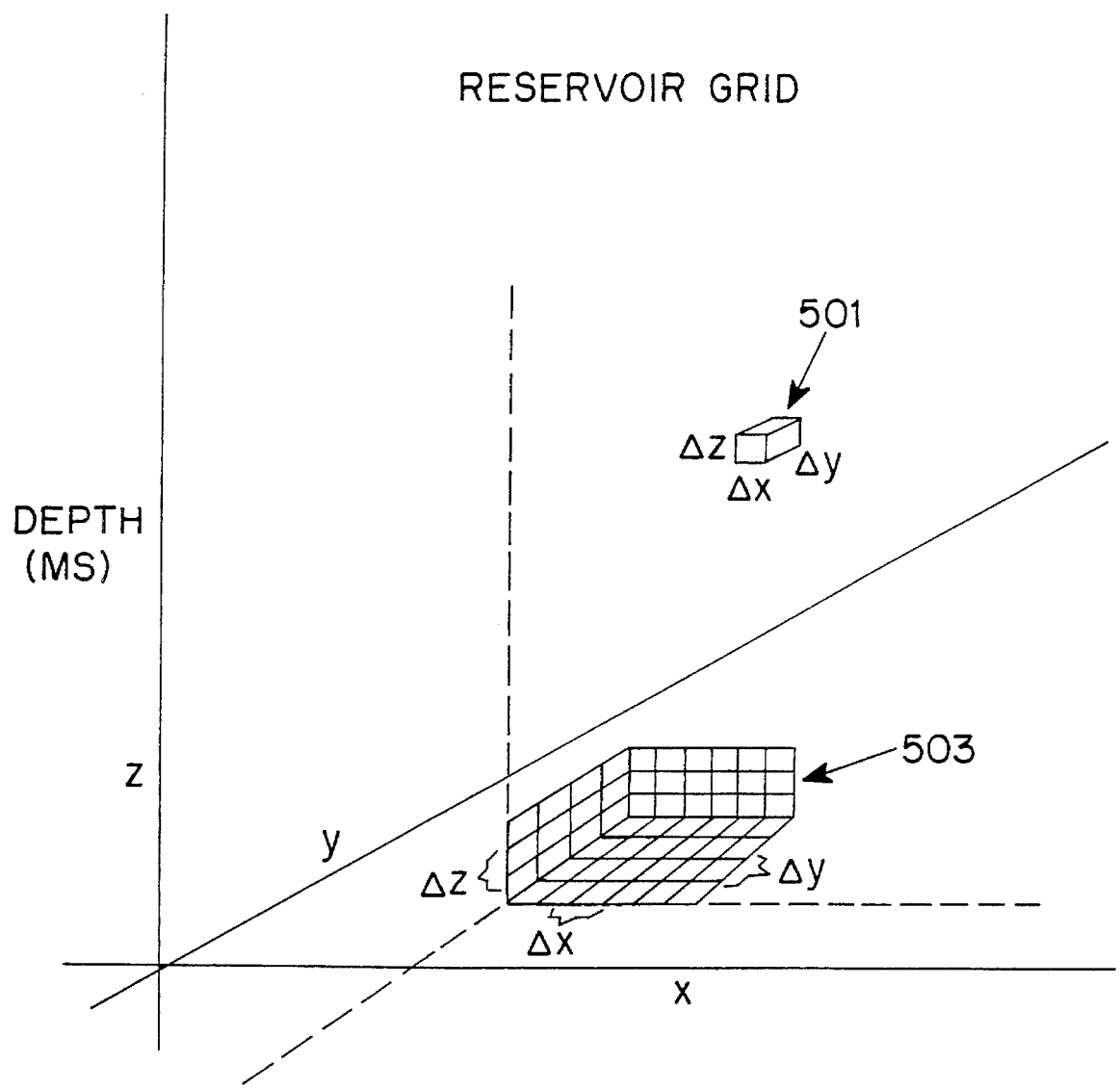
FIG. 5 is a schematic representation of the elemental voxels and the overall 3-D grid over which data was sampled and calculations were carried out in the exemplary embodiment.

In the standard processing of each survey, each 3-D seismic data set representing the sedimentary block of interest is computed such that it may be broken down into elemental "voxels" (501) of resolution ($\Delta x \Delta y \Delta z$) as shown schematically in FIG. 5. FIG. 5 shows the raw resolution of the 3-D grid (503) over which data is compiled and computations are carried out. Each voxel (501) contains the acoustic time series waveform (seismogram) of seismic amplitudes as reflected. After standard computational processing the seismogram represents the true acoustic reflectivity of the subsurface region contained in each voxel. The waveforms each represent seismic energy, typically initiated by a source such as an airgun (ensonification). The seismic waveform is recorded back at the surface following the energy's travel through the subsurface from top to bottom of the defined volume and reflection back to the surface from impedance boundaries encountered therein. As noted, FIGS. 3(A) and 3(B) are traditional 2-D profiles that represent a vertical slice of the subsurface acoustic variability versus depth. The horizontal scale in FIGS. 3(A) and 3(B) is approximately 4 miles and the vertical scale measured in sound travel time is approximately 3,000 milliseconds or about 2.1 miles given the speed of sound in the sedimentary layers mapped. The production of a significant volume of hydrocarbons to the surface has occurred between 1985 and 1988 through the boreholes of wells A-5 (309) and A-11 (311) within the LF Reservoir (301) shown in FIGS. 3(A) and 3(B).

As noted, the depth of the volume is measured in units of time, typically milliseconds, and can be converted to units of depth (z), typically in feet or meters, with knowledge of the velocity of sound in the various formations. The LF Reservoir (301), for example, sits at a depth of approximately 2,000 milliseconds or 7,000 feet. For the surveys used in the exemplary embodiment, the elemental voxels containing the smallest scale $\Delta x \Delta y \Delta z$ volume unit have resolution of approximately 40 feet×60 feet×4 milliseconds. Each voxel contains a representation of the acoustic reflective energy typically measured in decibels.

The preparation of multiple 3-D seismic surveys into a 4-D data set ready for intercomparison requires extraction of similar power spectra and regridding the data to ensure similar spatial locations and resolution. The likelihood that one or more of the seismic surveys are shot at different resolutions or have different origins and rotations is high. This is particularly true for offshore surveys. Accordingly, it is necessary to apply an orientation process that places each 3-D data set in the same space with the same resolution.

For purposes of the exemplary embodiment, the 1985 Pennzoil, 1988 Texaco and 1992 Shell 3-D seismic surveys were first converted to a common grid by interpolating the surrounding bins of the 1985 Pennzoil survey and the 1988 Texaco survey to produce bins that correspond to the coordinate grid of the 1992 Shell survey. Because in each survey z values are measured in milliseconds and each data set was sampled at 4 millisecond intervals, common resolution in the z direction was ensured. Alignment in the z (depth) axis simply involves cropping data sets. To establish coincidence and alignment in the x and y directions, simple linear interpolation using nearest neighbor techniques with the 1992 grid as a common basis was implemented.

The regridding and alignment computations were carried out using a computer program called orient_seismic which takes two non-coincident 3-D seismic data sets, establishes coincident regions, sets up a common grid and interpolates the seismic data of one data set using nearest neighbor techniques such that it sits in the common coordinate space. A source code listing of the orient_seismic subroutine is included in Appendix I.

Following reorientation, spectral characteristics of the surveys must also be matched. The frequency content of the surveys must be matched before the amplitudes can be matched because the amplitude content is dependent on how frequencies are matched.

Figure 6:
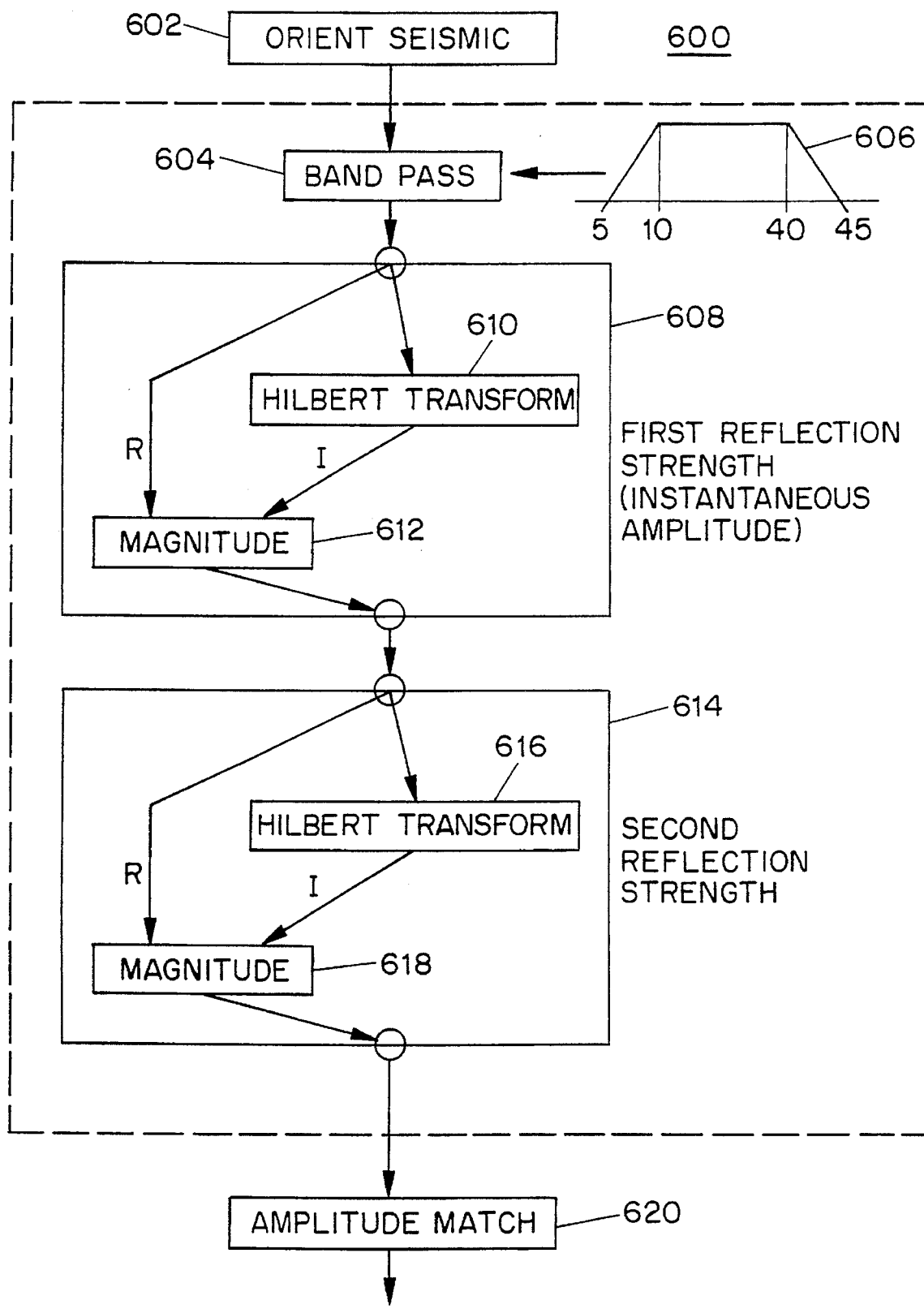
FIG. 6 is a block flow diagram representing the frequency matching procedure used in the invention.

In order to match the frequency content of the data sets, the procedure (600) shown in block flow format in FIG. 6 is applied to each data set. Following spatial orientation by orient_seismic (602), the data is run through a band pass filter (604) of a trapezoidal form with breakpoints at 5, 10, 40 and 45 $H_z$ (606). Following application of the band pass filter, the first reflection strength (608) (also known as the instantaneous amplitude) is calculated. This is accomplished by taking the Hilbert Transform (610) of the seismic trace to calculate an imaginary component, I, and combining it with the actual trace which acts as the real component, R, as in Anderson and He. The absolute magnitude (612) of the complex trace representation known as the instantaneous amplitude or first reflection strength is then taken. The second reflection strength calculation (614) repeats this procedure by taking the Hilbert Transform (616) of the instantaneous amplitude to establish an imaginary component, I, combining it with the instantaneous amplitude which acts as the real component, R, and taking the absolute value of the combined magnitude (618) to determine the second reflection strength. The calculation of the second reflection strength is described in detail in Anderson and He. As described, the process of determining the second reflection strength inherently results in frequency matching as shown in FIG. 4. It may be noted that the amplitudes of the second reflection strength, may be stored, and later employed as the seismic attribute used to map the High Amplitude Regions.

Figure 4A:
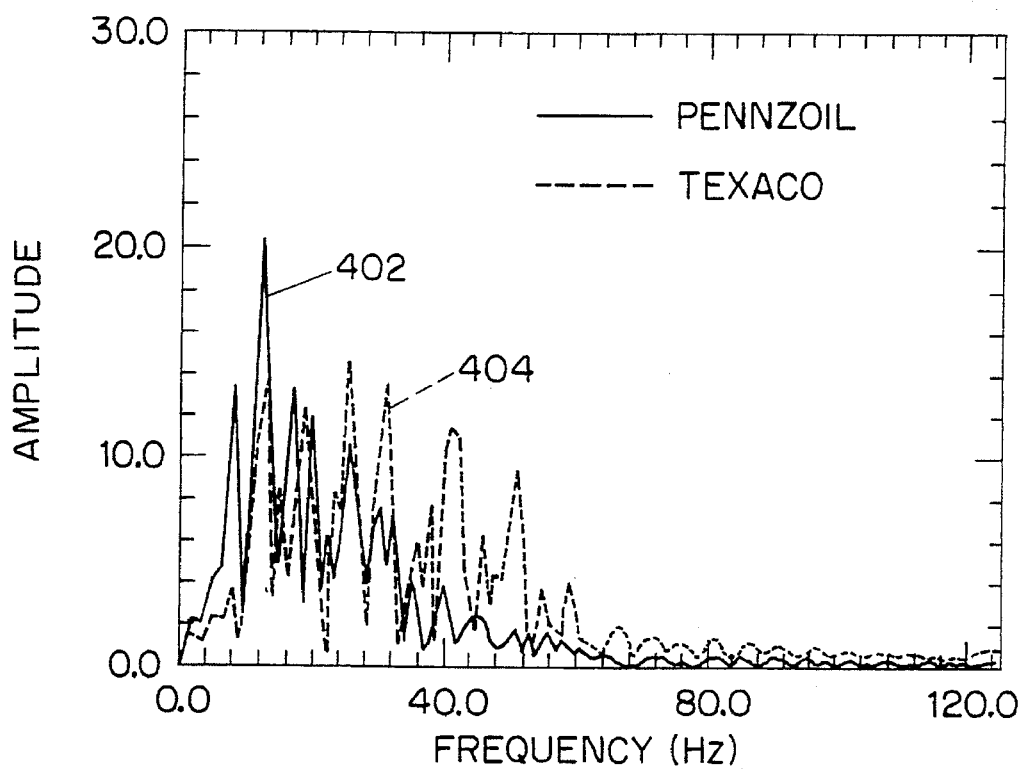
FIGS. 4(A), 4(B), 4(C) and 4(D) are graphs showing the power spectrum and frequency matching features of the invention as used on the 1985 Pennzoil and 1988 Texaco survey data.

The effect of the frequency matching process on the raw seismic trace data is illustrated in FIGS. 4(A)–(D). FIGS. 4(A)–(D) show the effect on the power spectra of the 1985 Pennzoil and 1988 Texaco survey after processing according to the flow outlined in FIG. 6. FIG. 4(A) shows the power spectra of the raw frequency data from the 1985 Pennzoil survey (402) and the 1988 Texaco survey (404). As noted above, the power spectra of the two surveys are significantly different, due primarily to differences in obtaining and processing the raw data from the two surveys. As can be seen in FIG. 4(A), the raw power spectra from the 1988 Texaco survey contain significantly more high frequency energy than the 1985 Pennzoil survey.

Figure 4B:
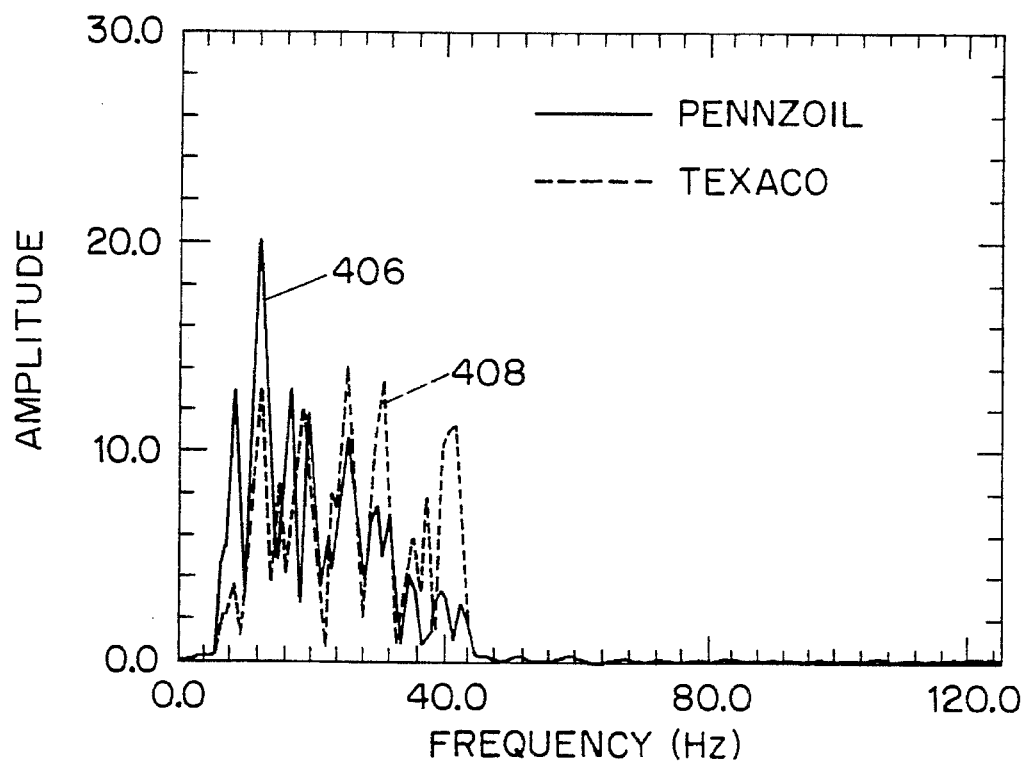
Figure 4C:
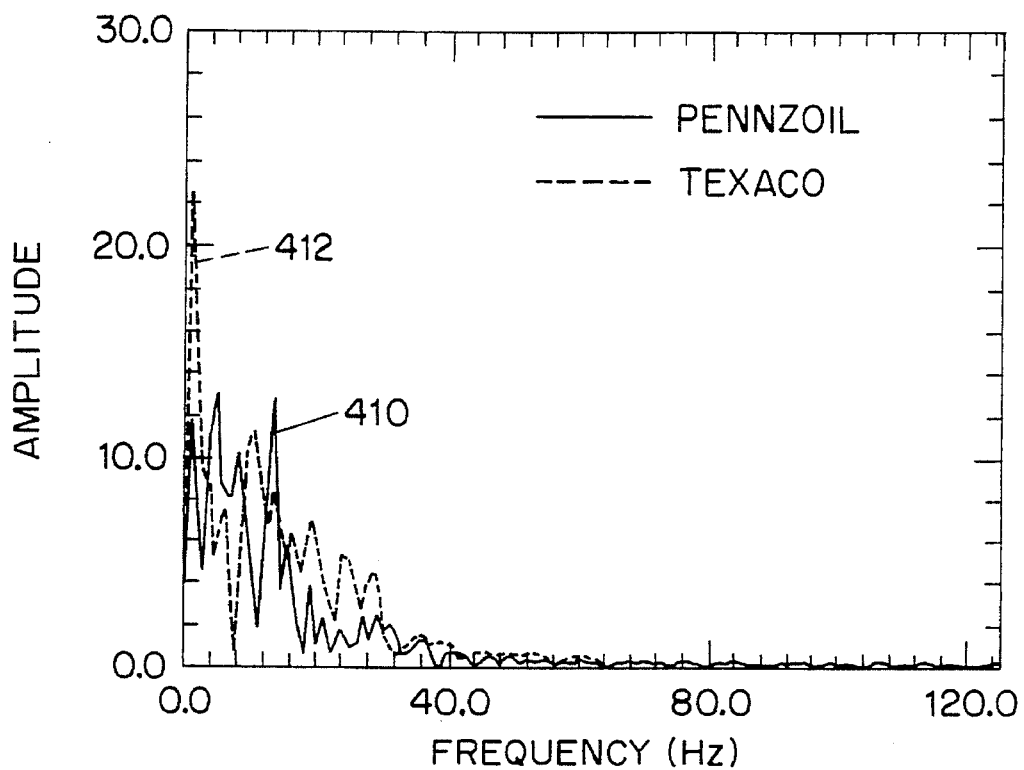
Figure 4D:
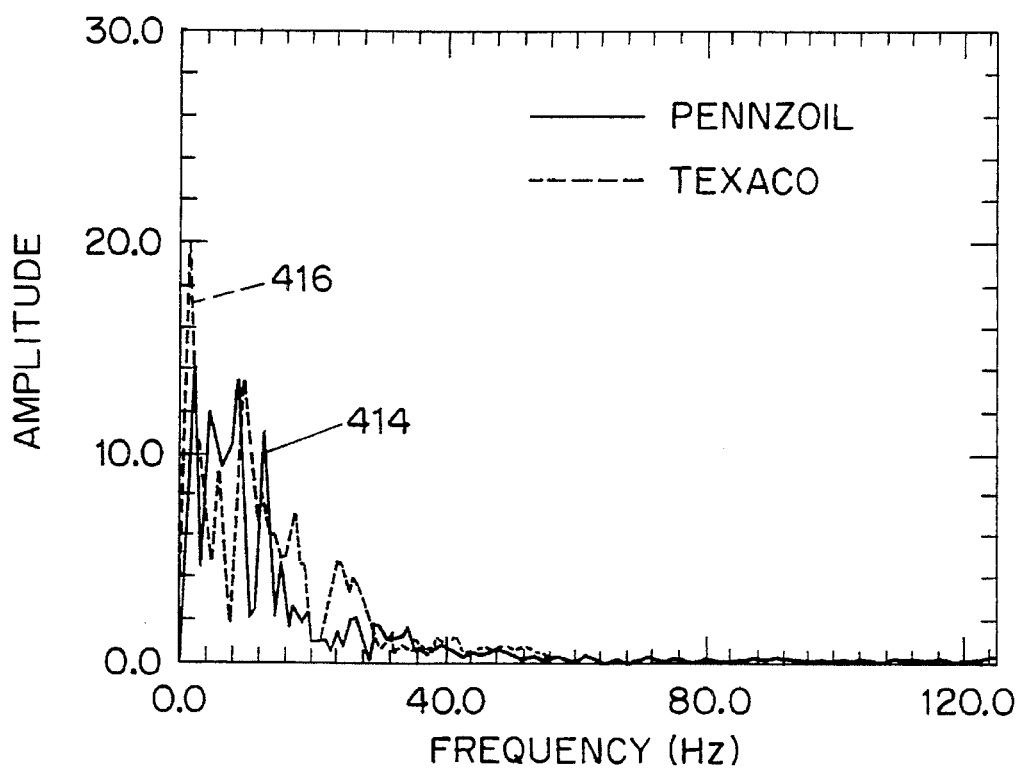

FIG. 4(B) shows the resulting power spectra after application of the band pass filter (604) for the 1985 Pennzoil survey (406) and the 1988 Texaco survey (408). FIG. 4(C) shows the resulting power spectra for the first reflection strength or instantaneous amplitude for the 1985 Pennzoil survey (410) and the 1988 Texaco survey (412). FIG. 4(D) shows the derived power spectra for the second reflection strength for the 1985 Pennzoil survey (414) and the 1988 Texaco survey (416). As can be qualitatively seen in FIG. 4(D), following the calculation of the second reflection strength, the power spectra distribution of the 1985 and 1988 surveys are highly correlated.

Following frequency matching, the data are matched in amplitude (620). The amplitudes of the surveys are aligned by adjusting the dynamic range of each survey until an acceptable alignment is reached by looking at the amplitude histograms. The effect of amplitude matching is shown generally in FIGS. 7(A)–(D). The matching was accomplished by picking a point on the tail of the histogram of the survey with the broadest amplitude distribution to align, via a linear rescaling of amplitudes, with a similar point on the other surveys.

Figure 7A:
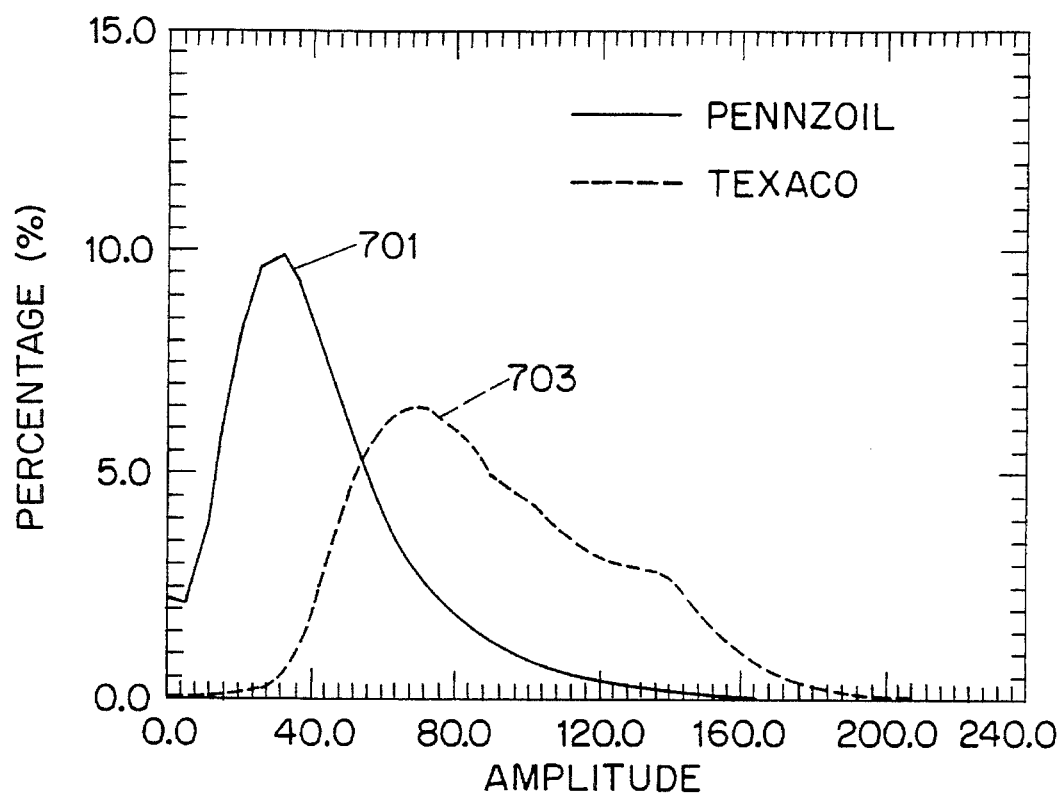
FIGS. 7(A), 7(B), 7(C) and 7(D) show histograms of the second reflection strength amplitude from the 1985 Pennzoil and 1988 Texaco surveys both before and after amplitude matching.
Figure 7B:
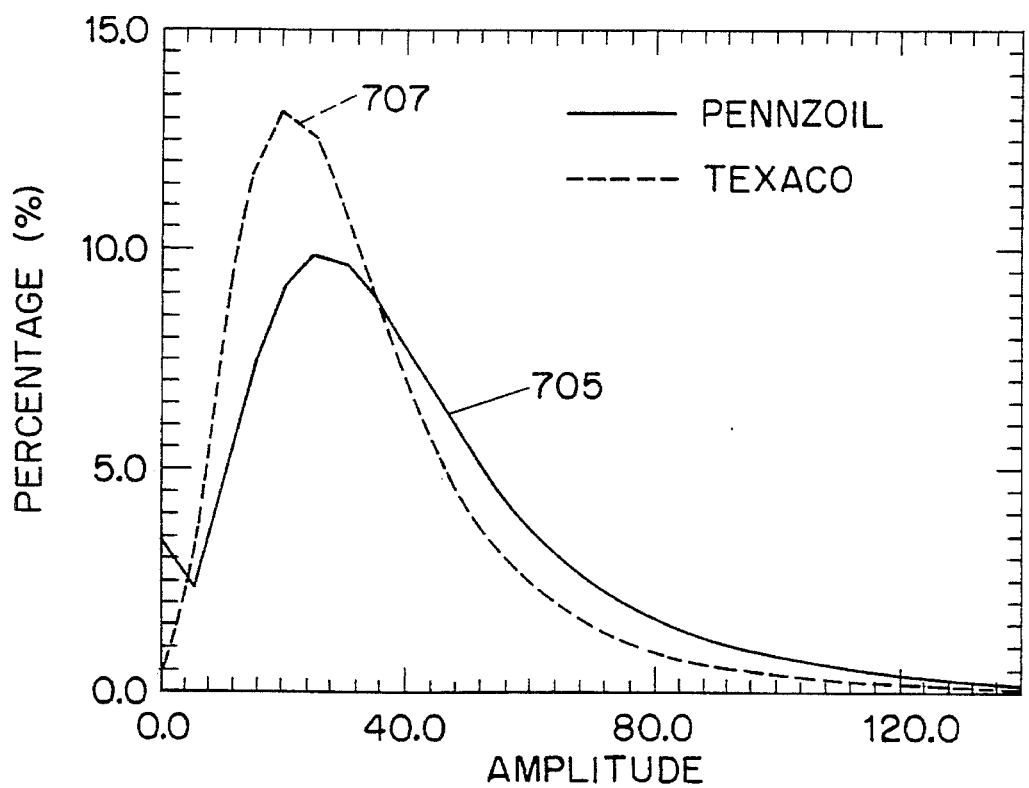

FIGS. 7(A)–(D) show this amplitude matching process as applied to the 1985 Pennzoil survey and the 1988 Texaco survey. FIG. 7(A) is a histogram of the second reflection strength data following frequency matching for the 1985 Pennzoil survey (701) and the 1988 Texaco survey (703). As noted above, the raw amplitude distribution for the two surveys is not highly correlated due to differences in surveying techniques and processing. The 1988 Texaco survey (707) has the broader amplitude distribution and was rescaled to match the 1985 Pennzoil data (705) as shown in FIG. 7(B).

Figure 7C:
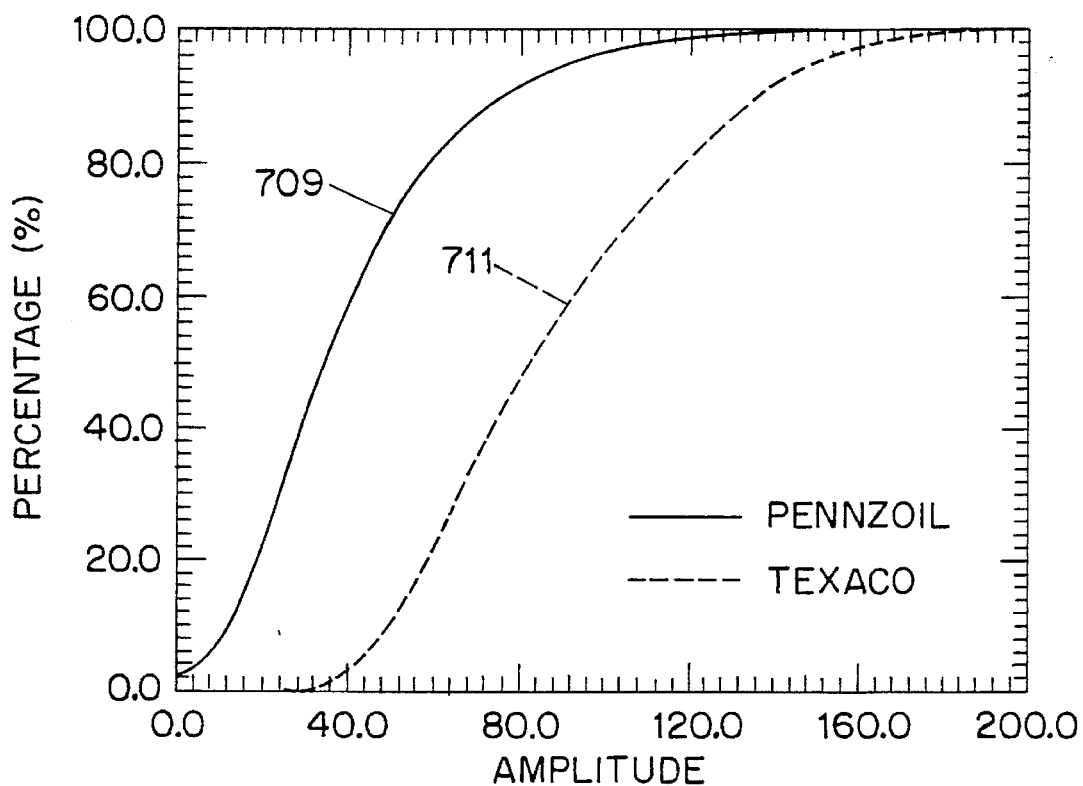
Figure 7D:
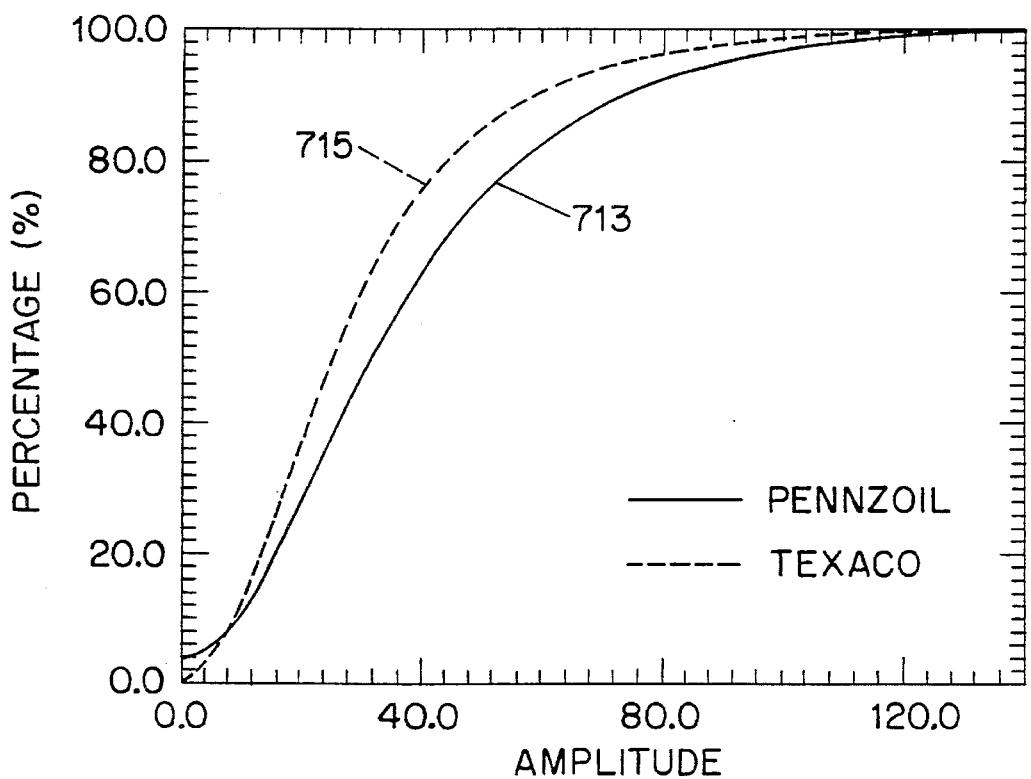

In carrying out the methodology for the exemplary embodiment, the rescaling was done by "eye". For the data shown in FIG. 7(B), the 1988 Texaco data (707) has been scaled down by a factor of approximately three. Rescaling of the data was done manually, using trial and error, until the best qualitative match between surveys was found by eye. An automated statistical matching process could be substituted in practicing the invention. FIGS. 7(C) and 7(D) show the cumulative percentage of the amplitude histograms shown in FIGS. 7(A) and 7(B). The cumulative data prior to normalization is shown for the 1985 Pennzoil survey (709) and 1988 Texaco survey (711) in FIG. 7(C) and after amplitude matching for the 1985 survey (713) and 1988 survey (715) in FIG. 7(D).

Seismic Attribute Extraction

Once the data from each survey coincides spatially and have been matched in amplitude and frequency, it will be known to those skilled in the art that seismic attribute analysis may be performed on each data set to identify signals consistent with the presence of oil and gas. Complex trace analysis may be performed on reflective seismic traces to derive the "attributes" of the seismic trace consistent with the presence of hydrocarbons. Seismic attributes identified in accordance with the techniques detailed in Taner et al. include the reflection strength, the instantaneous phase, the instantaneous frequency, the averaged weighted frequency and apparent polarity or phase change. As previously noted, in the exemplary embodiment, the seismic attribute known as the second reflection strength is used to identify hydrocarbon regions. However, it is anticipated that any or all of the above-identified seismic attributes identified using complex trace analysis could be utilized in accordance with the invention. Because the exemplary embodiment has already calculated the second reflection strength of Anderson and He in the frequency matching process, no additional seismic attribute analysis was required. Where other seismic attributes are utilized, their attribute values would be calculated throughout the region of interest for each survey, and each voxel used for computational analysis would be associated with a representative attribute value derived from the volume represented by the voxels.

Median Filtering

Following extraction of the seismic attribute desired for identification of High Amplitude Regions correlated with the presence of hydrocarbons, it is desired to determine the extent, structure and connectivity of these High Amplitude Regions.

At this point in the procedure, those practicing the methodology herein described, will have multiple 3-D seismic surveys broken into coincident computational voxels (501) as shown in FIG. 5, with each voxel being associated with the local value of the second reflection strength amplitude which has been frequency and amplitude matched such that the data sets are normalized for intercomparison or supplementation. As previously noted, the resolution obtained from the surveys utilized correspond to voxel resolutions of approximately 40 feet×60 feet×4 ms. The 4 ms $\Delta z$ sampling rate corresponds to a $\Delta z$ of between 10 and 50 feet depending on the velocity of sound through the region. Over the entire basin region over which the overlapping surveys are used (the Eugene Island 330 Block (214) shown in FIG. 2), the raw voxel distribution is approximately 770×180×750 voxels. For the smaller scale analysis of the LF Reservoir, the entire reservoir is contained in a rectangular array of approximately 150×200×40 voxels. It may be noted that hydrocarbons identified with the LF Reservoir itself fill only about 40,000 voxels, or 4% to 5%, of the array.

If the amplitude data is particularly noisy, it may be difficult to image connectivity among High Amplitude Regions where these regions are grown as discussed in greater detail below. In such cases, it may be advantageous to process the amplitude data with a median filter or other smoothing process prior to region growing. In the exemplary embodiment, a median filter was used in imaging the High Amplitude Regions of the large scale sedimentary basin. It was found that median filtering was not necessary in growing the High Amplitude Region at the individual reservoir scale, i.e., within the LF Reservoir.

The median filter used in the exemplary embodiment smooths the amplitude data by replacing the amplitude of each individual voxel with the median amplitude value, Amedian, of all direct neighbors of each individual voxel. The process is shown schematically in FIG. 10(A).

Figure 10:
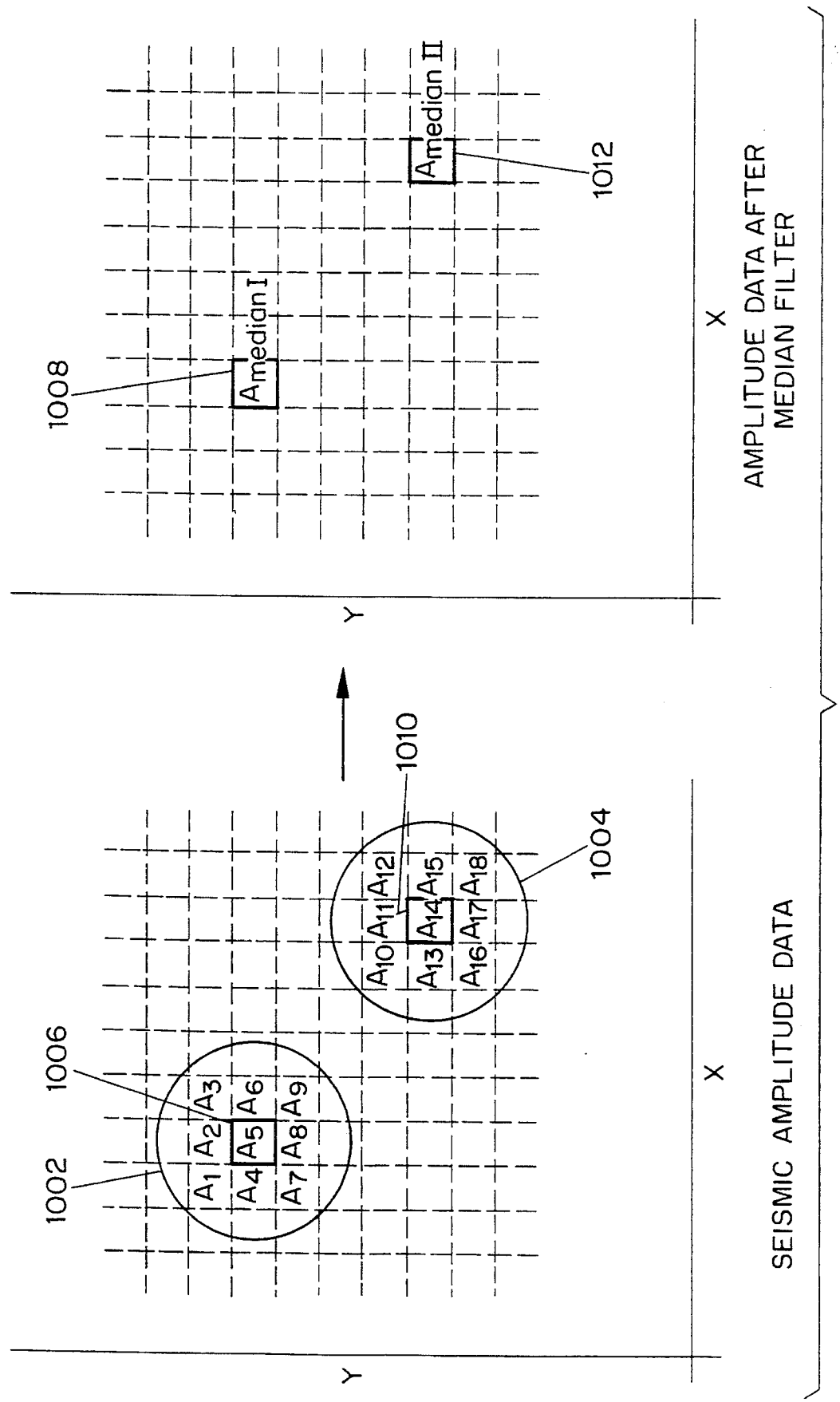
FIG. 10 is a schematic representation of the median filtering process by which the seismic data surveys may be smoothed prior to region growing.

FIG. 10 shows the functioning of the median filter in two dimensions. Prior to processing by the median filter, each data set is represented by voxels with representative amplitude values, $A_i$. Two voxel groupings (1002 and 1004) are shown. The processing by the median filter replaces each voxel's amplitude value with the median value of surrounding voxels. For example, in Group I (1002), amplitude value $A_5$ (1006) is replaced by the median amplitude value, $A_{medianI}$ (1008), of all voxels in Group I. In two dimensions this is the median of nine voxels, $A_1$–$A_9$. Similarly, the amplitude of $A_{14}$ (1010) is replaced by the median value, $A_{medianII}$, within Group II (1004), i.e., $A_{10}$–$A_{18}$. In three dimensions, as processed in the preferred embodiment, each voxel has twenty-six direct neighbors. Effectively, a 3×3×3 cube is traversed in one voxel steps throughout the entire array, and at each point, the central voxel amplitude value is replaced by the median amplitude value of the twenty-seven voxels within the cube. The effect of this median processing is to smooth the data set such that noise and very small scale features are not carried forward. It is expected that averaging techniques or other smoothing operators could be used on the amplitude data set to produce similar results.

In practicing the methods as disclosed in the exemplary embodiment, the median processing was carried out using a computer program called median_filter.c. A source code listing of the median_filter.c subroutine is included in Appendix I.

High Amplitude Region Growing

After median filtering, or directly after seismic attribute extraction if the data set is sufficiently smooth, the High Amplitude Regions must be identified and grown to determine structure and interconnectivity. The High Amplitude Regions or bright spots are segmented using a 3-D version of "region growing," a standard method for segmentation in image processing. See, e.g., "Segmentation," Encyclopedia of Artificial Intelligence, Vol. 2, Second Ed. p. 1473, 1992.

Figure 12:
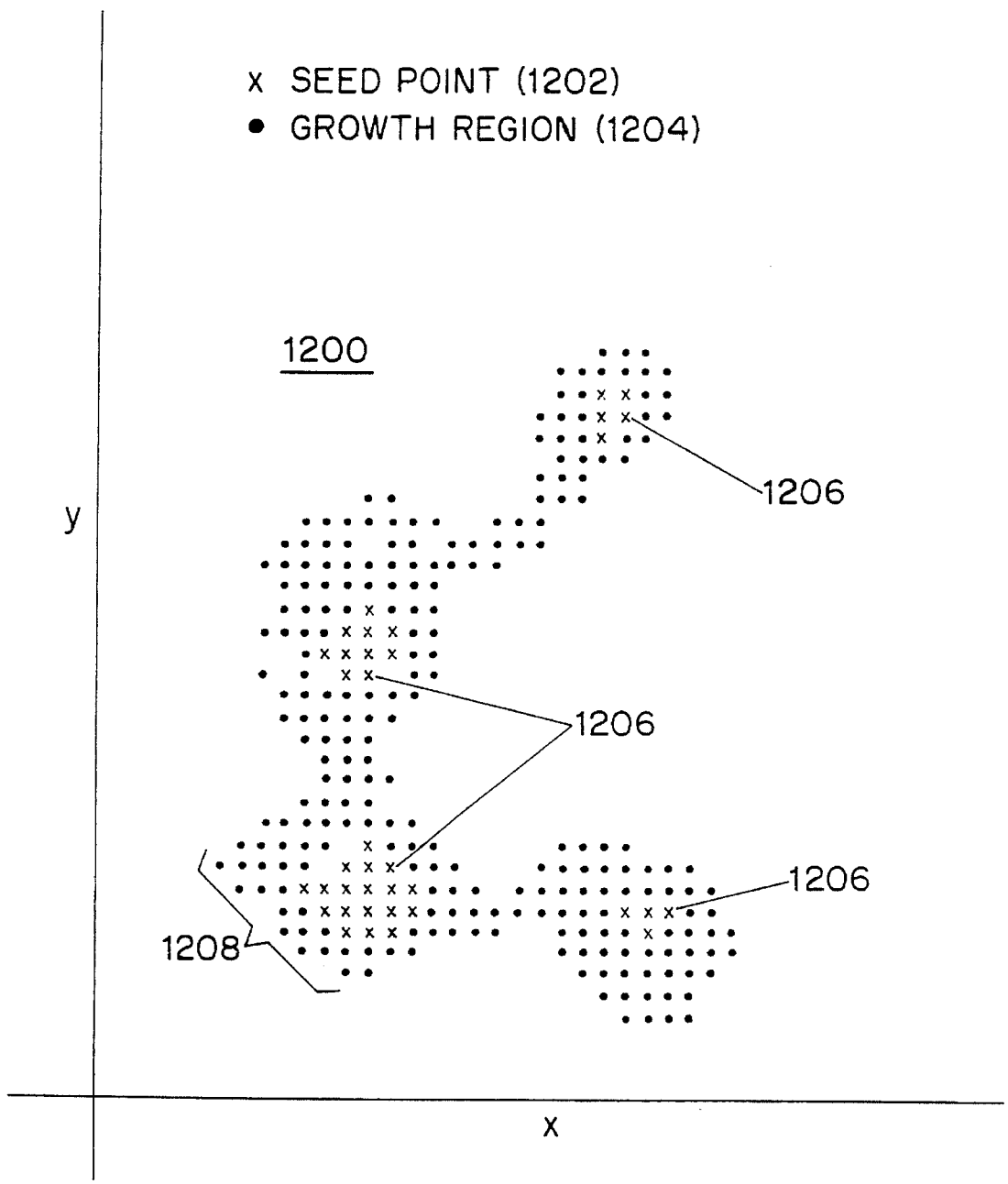
FIG. 12 is a schematic representation of the region growing procedure, where the High Amplitude Region is grown from initial seed points to all neighboring voxels above a preset growth threshold.

The region growing process is shown schematically in two dimensions in the x-y plane (i.e., a top view) in FIG. 12. The High Amplitude Regions (1200) are grown from the highest amplitude voxels outward. Initial high amplitude seed points (1202) are chosen from which the High Amplitude Region (1200) is grown. In the exemplary embodiment, seed points were chosen as all voxels having amplitudes of the second reflection strength which are a given percentage of the maximum amplitude within the sample. In practicing the exemplary embodiment, the seed point threshold was set at 85%.

Once all seed points (1206) are identified as shown schematically in FIG. 12, the High Amplitude Regions are grown by choosing a lower amplitude threshold to define growth voxels (1204). For example, in the exemplary embodiment, the lower growth threshold was set at 45% of maximum amplitude. Below 45% of maximum amplitude, the sample is no longer considered part of the High Amplitude Region.

Thus, following the identification of seed points (1206), the High Amplitude Region is grown to encompass voxels (1208) within the lower growth threshold. Regions are initially grown by sampling each voxel neighboring the seed point voxels. If neighboring voxel amplitudes are identified as being above the growth threshold, the voxels are marked as being included within the High Amplitude Region. The amplitude of all voxels neighboring marked voxels are then checked to see if the neighbors are above the growth threshold. This process continues until all voxels above the growth threshold grown from the initial seed points are identified.

The resulting High Amplitude Regions and their interconnectivity paths, shown schematically in FIG. 12, are interpreted as regions and pathways associated with hydrocarbons. However, several other phenomena affecting seismic amplitude must be investigated as well, such as spatial changes in rock properties as opposed to fluid properties. Diagenesis (chemical precipitation), for example, is known to produce high seismic amplitudes in rock with no oil or gas present. These effects can be distinguished from oil and gas signals through log and core analysis. In the exemplary embodiment, self-contained regions smaller than a preset limit, chosen to be eighty-one voxels in the exemplary embodiment, are discarded as noise.

The region growing thus results in a 3-D distribution of voxels associated with the High Amplitude Regions. This result holds both for large scale basin regions where median filtered voxels are grown and for fine scale reservoir analysis where raw resolution (or median filtered) voxels are grown. In the exemplary embodiment, this includes all voxels above 45% of the maximum amplitude which are grown from initial seed points and are connected via region growing, and not associated with small scale noise. The voxels identified within a High Amplitude Region, of course, may be associated with their individual amplitude values. This association will be particularly useful in the differencing analysis of time dependent 4-D data sets when imaging small scale drainage patterns within reservoirs, as will be discussed below.

The computations involved in region growing for the exemplary embodiment were carried out using a computer program called grow_region.c. A source code listing of the subroutine grow_region.c is included in Appendix I.

Surface/Mesh Extraction

Figure 11:
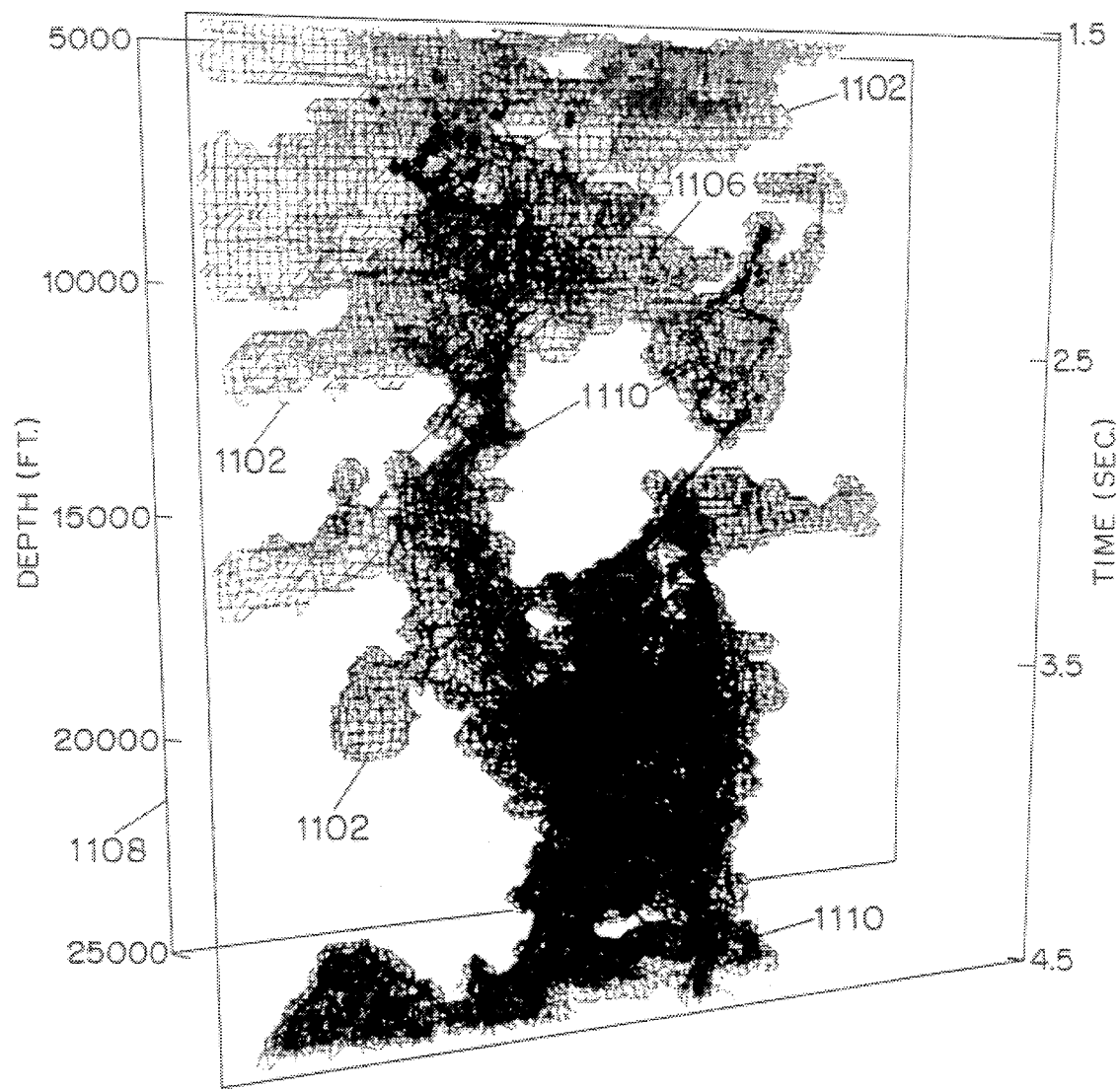
FIG. 11 shows the derived outer shell/mesh of the High Amplitude Region associated with the entire sedimentary basin region studied, and includes a representation of "buoyant balls" used in advection/migration modelling.

In imaging the large scale structure and migration patterns of the entire basin region and the small scale structure of reservoirs and their drainage paths, various imaging techniques may be used. In order to visualize the 3-D structure of the region, the exemplary embodiment utilizes a procedure for extracting the geometry of the outer surface of the High Amplitude Region. This results in a 3-D representation of the plumbing "shell" of the migratory paths and an outer shell of the smaller scale reservoirs. The geometry is built by extracting the exterior points of the surface and rendering an outer mesh for the surface as shown in FIGS. 11 and 15 for the large scale basin and reservoir respectively. In the exemplary embodiment a triangular mesh according to the processes described in Lorensen et al., Marching Cubes "A High Resolution 3D Surface Construction Algorithm," Comput. Graph., Vol. 21, pp. 163–170 (July 1987), is used.

The processing involves two steps to obtain an outer surface mesh. First, outer boundary voxels are identified by looking at six neighbors of each voxel associated with a High Amplitude Region. If a voxel's neighbor is not marked as being included in the High Amplitude Region, it is known that a High Amplitude Region boundary has been reached. All boundary voxels may thus be marked.

Figure 13:
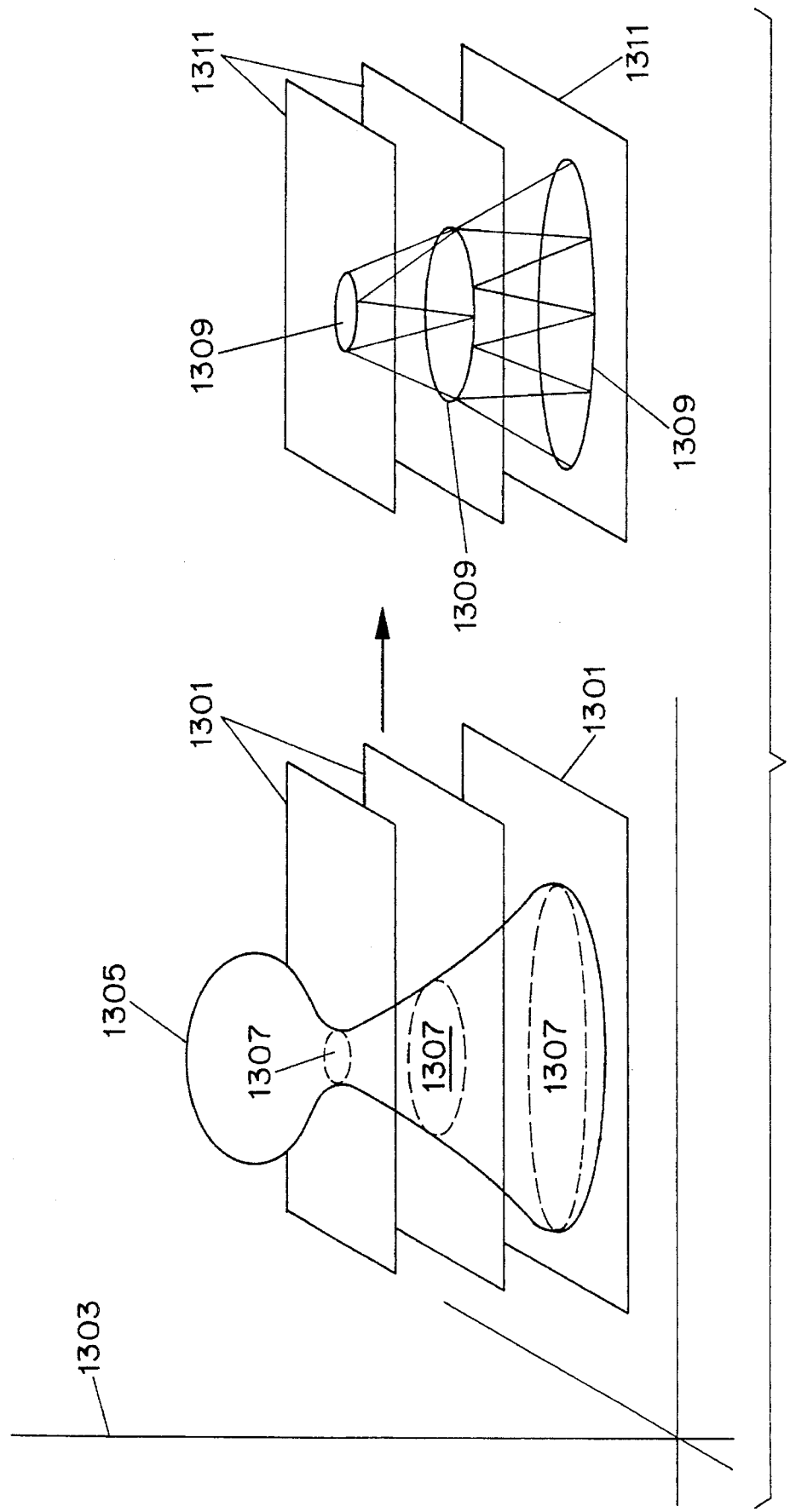
FIG. 13 is a schematic representation of the 3-D surface extraction and meshing processes utilized in the exemplary embodiment.

Second, as shown schematically in FIG. 13, slices (1301) of the volume wherein boundary voxels have been identified are taken perpendicular to the z axis (1303) through the High Amplitude Region (1305). Three representative slices (1301) are shown schematically in FIG. 13 as superimposed x-y planes. The x-y contours (1307) of the High Amplitude Region boundaries for each slice are defined simply by the intersection of the High Amplitude Region surface with each x-y plane. The superimposed contours may be smoothed using conventional techniques to avoid jagged edges which will result if actual voxel boundaries are plotted. In the practice of the exemplary embodiment an averaging technique was used to smooth the contours wherein the spatial coordinates of the voxels residing within a smoothing window were averaged.

Corresponding points on each contour were then connected by a triangular mesh according to the well known methodology discussed in Lorensen et al. The effect of the meshing technique is shown in FIG. 13 where the surface contours (1309) of three x-y slices (1311) through the High Amplitude Region surface are connected by a triangular mesh (1313).

When all x-y contours for the entire region of interest are connected, the result is a 3-D surface enclosing the High Amplitude Region as shown in FIGS. 11 and 15 for the basin region and LF Reservoir, respectively. Of course, any visualization technique may be used, and the above embodiment is provided merely by way of example.

The computations involved in extracting the surface, smoothing the contours and rendering the mesh were carried out using a computer program called res_builder.c. A source code listing for res_builder.c is included in Appendix I.

Figure 14:
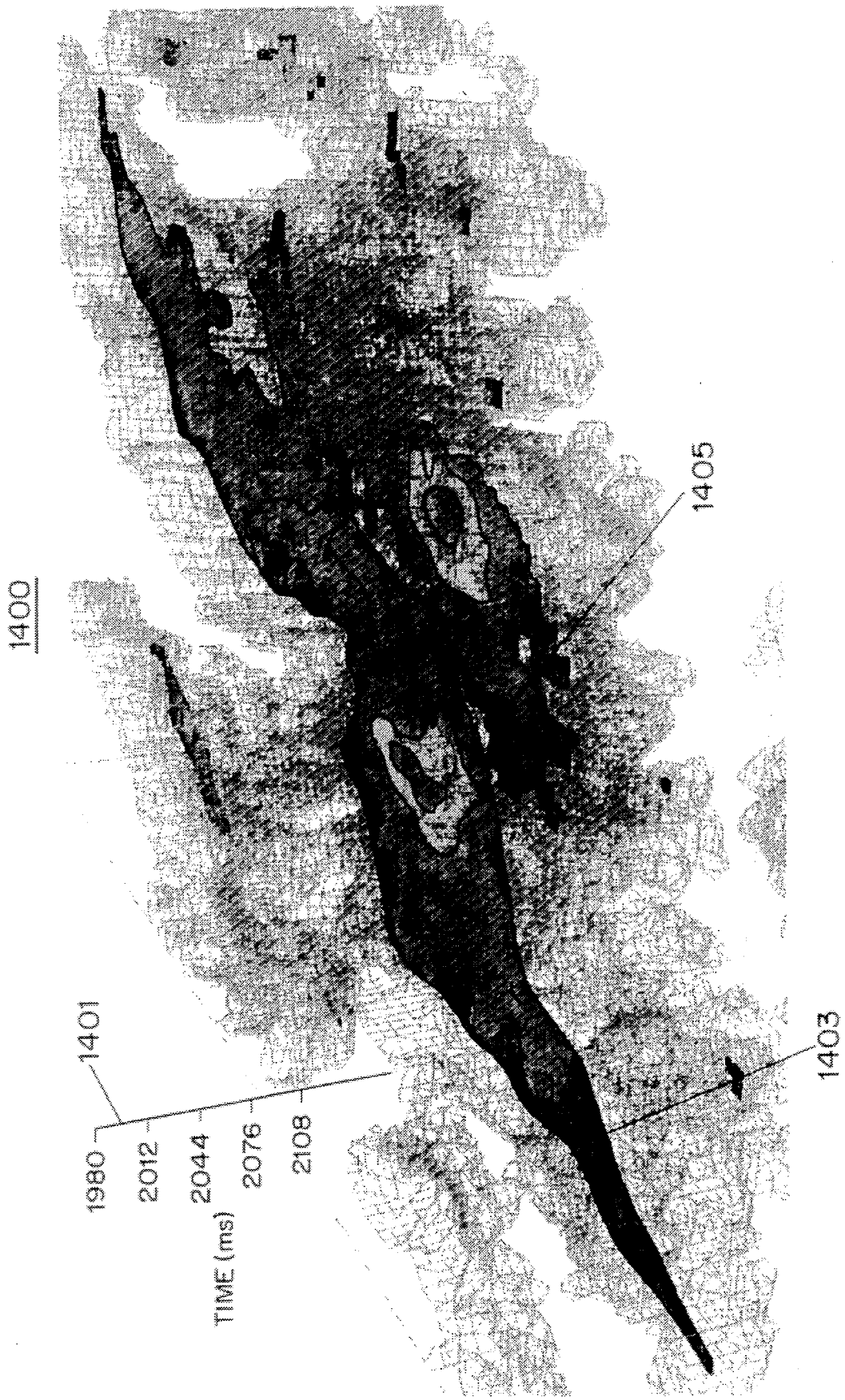
FIG. 14 shows the derived outer shell/mesh of the High Amplitude Region associated with the LF Reservoir, and includes a 2-D time slice showing amplitude contours within the reservoir.

FIG. 11 shows the overall derived geometry for the High Amplitude Region for the entire sedimentary basin as a contoured mesh (1102) processed according to the exemplary embodiment. Producing reservoirs, including the LF Reservoir (1106) exist near the surface regions and the migratory plumbing pathways from deep source regions are shown by the outer shell structure (1102). FIG. 14 shows a 3-D mesh rendering (1400) of the outer regions of the LF Reservoir as processed according to the exemplary embodiment. The z axis scale (1401) shows the reservoir scale to be only about 150 milliseconds in depth as opposed to the 5,800 ms/25,000 ft. depth of the entire basin region (1108). Superimposed on the 3-D rendering of FIG. 14 are two x-y plane time slices showing amplitude contours within the reservoir (1403 and 1405).

Advection of Hydrocarbons

Once the geometry of the plumbing shell has been identified, it is possible to confirm the physical viability of the geometry by simulating the migratory movement of hydrocarbons through the connected regions from a deep source. The results of such a simulation are shown in FIG. 11 where buoyant balls (1110) appearing as darker regions are shown to have moved through the identified High Amplitude structure (1102).

The preferred embodiment utilized a Monte Carlo approach to simulate migration by employing multiple random walk particles (buoyant balls (1110)) constrained by the shell of the High Amplitude Region (1102). The walk direction was implemented by using a random choice of only those directions having no downward component to them. This simulates the diffusive migratory process with an upward bias representing buoyancy. It is also possible to use first principle simulations of fluid motion at higher computational expense. The assumptions behind the rough-cut approach utilized are that the seismic amplitude connectivity correlates with the permeability network present in the rock, and that the migration of hydrocarbons leaves a trail of "charge" in the rock as the fluids pass through, thus producing a seismic amplitude network that can be grown according to the invention.

The advection/migration calculations were carried out using a computer program called fluid_migration.c. A source code listing of the subroutine fluid_migration.c is included in Appendix I.

Similarities and Differences Between Data Sets at the Reservoir Scale

For the small scale reservoir data where dynamic evolution may be expected to occur over the time scale between surveys, it is possible to analyze the changes in High Amplitude Regions that occur between surveys. Due to the use of the robust region growing operator described above and the short time period between surveys, the overall geometry of the High Amplitude Region identified as a reservoir will not change appreciably between surveys. However, changes in amplitude within the High Amplitude Region itself may be mapped and significant structure revealed.

Figure 8:
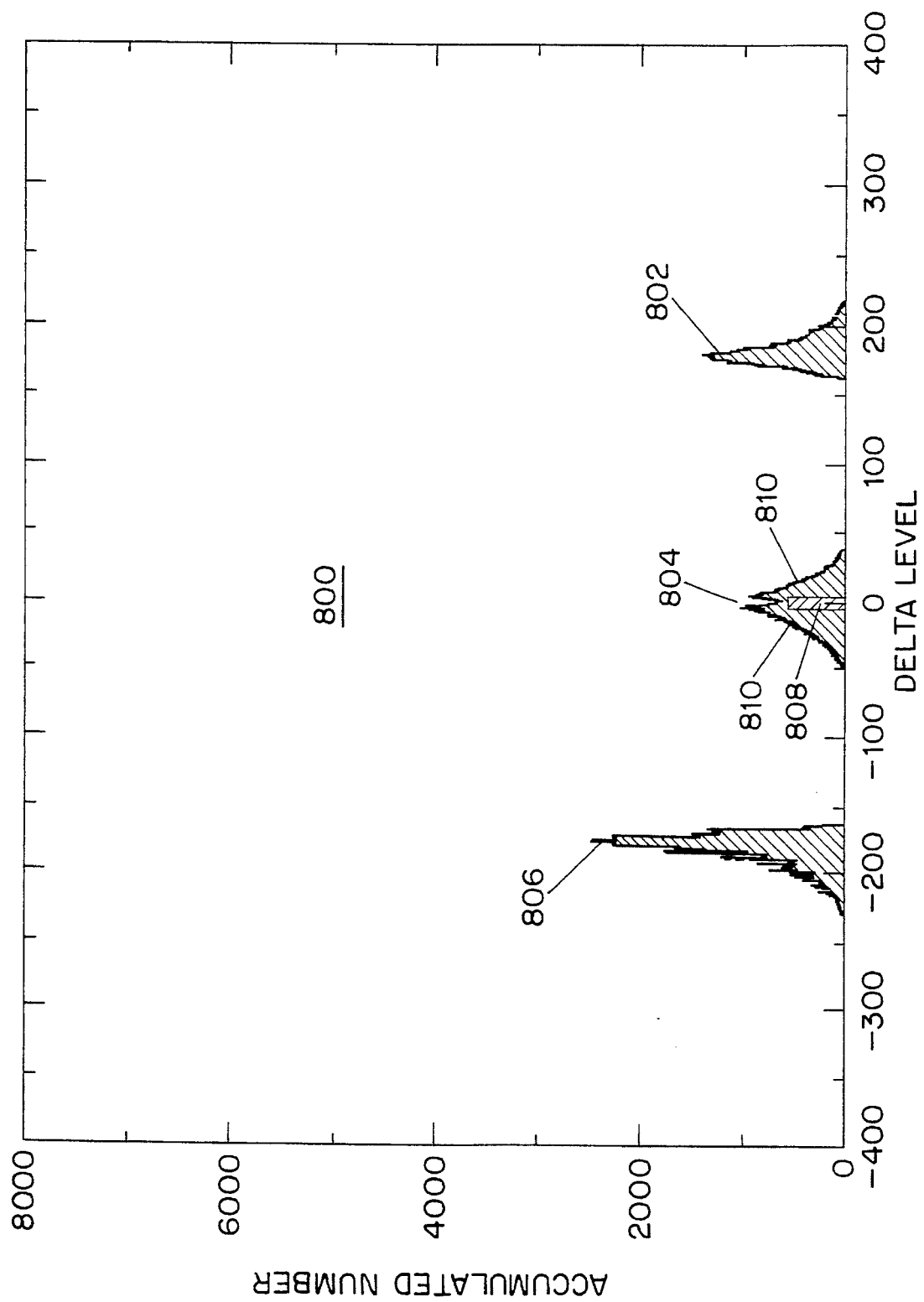
FIG. 8 shows the histogram of the differenced second reflection strength data for the LF Reservoir between the 1985 Pennzoil and 1988 Texaco surveys.

The changes occurring between surveys can be mapped for a reservoir of interest by subtracting the amplitude value within each voxel of a High Amplitude Region in one survey from the corresponding High Amplitude Region in a second survey. FIG. 8 shows a histogram of the differenced data from the LF Reservoir as imaged from the 1985 Pennzoil survey and the 1988 Texaco survey. The histogram (800) of the similarities and differences qualifies the changes in amplitude produced by movement or drainage of hydrocarbons within the LF Reservoir. The histogram shows three well separated distributions which are distinct regions of amplitude increase (802), little or no change in amplitude (804), and decrease in amplitude (806). The areas of increased amplitude (802) are interpreted to be due to gas-to-oil ratio increases and secondary gas dissolution caused by the decrease in reservoir pressure in turn caused by production. The area of decreased amplitude (806), a dim-out, is caused primarily by water encroachment or fluid compressibility changes. The central histogram distribution (804), where little or no change in amplitude is observed, represents regions of bypassed pay or porous drainage pathways. The central portion (808) of the middle distribution (804) has zero or near zero delta levels. Regions associated with these voxels are interpreted as bypassed pay regions or high porosity drainage paths, depending on prior knowledge of production in the area. It is noteworthy that either interpretation yields highly attractive well sites. Areas of slight amplitude change (810) within the middle distribution (804) are interpreted as regions of oil with some amount of production effect, i.e., increased differential pressure.

Identification of Drainage Pathways and Bypassed Pay

Figure 9:
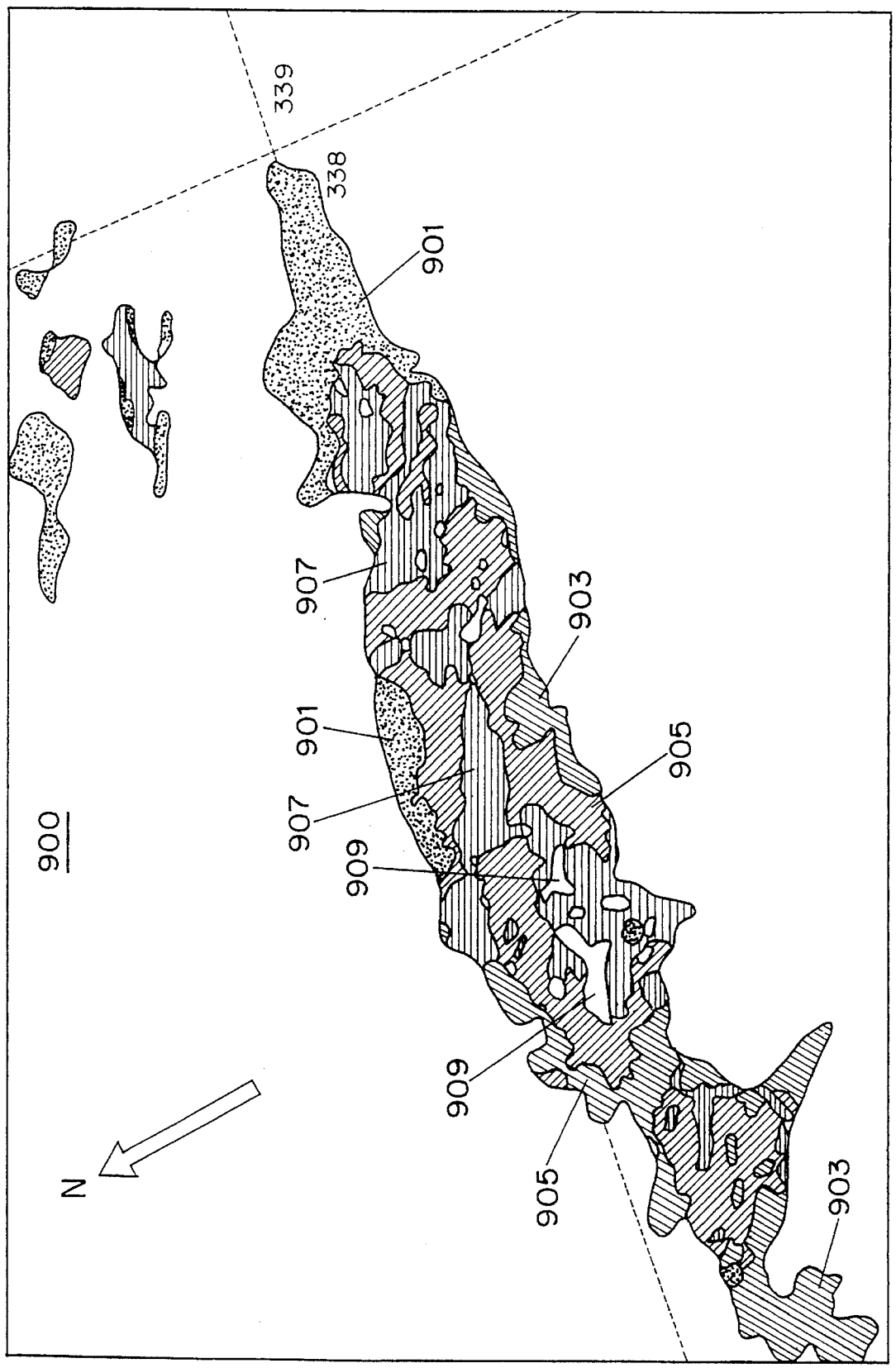
FIG. 9 shows a two-dimensional time slice through the LF Reservoir where differenced data between the 1985 Pennzoil and 1988 Texaco surveys have been plotted, from which porous drainage patterns and bypassed pay regions can be identified.

Given the above interpretation of the differencing analysis it is relatively straightforward to map porous drainage pathways and/or areas of bypassed pay to aid in siting wells for maximum recovery. FIG. 9 represents a time slice, i.e., top view of the x-y plane, of the LF Reservoir at a depth of t=2,028 milliseconds (900). The differenced data is contoured according to their delta values. This 2-D view of the differenced data of the LF Reservoir High Amplitude Region clearly shows regions of water encroachment (901), gas dissolution (903), slightly produced oil (905), areas of bypassed pay or drainage pathways (907), and amplitude voids (909). If multiple time slices are imaged, the three dimensional geometry of drainage pathways and bypassed pay regions (907) can be extracted. These dynamic pathways and untapped oil regions are extremely attractive targets in hydrocarbon prospecting.

While the invention has been described in terms of the foregoing specific embodiments thereof, it will be apparent to those skilled in the art that various alterations and modifications may be made to the described embodiments without departing from the scope of the invention, as defined by the appended claims. For example, the precise means for orientation and spectral mapping may vary, the seismic attribute used to identify hydrocarbon regions may be selected from a large number of trace attributes known to those skilled in the art, the means of region growth for High Amplitude Regions need only be robust in that regions of interest register similarly between surveys, and the means of visualizing the derived structure and any median or averaging techniques may be drawn from the vast fields of image analysis and statistical analysis. The processing detailed in the disclosure of the exemplary embodiment is provided merely by way of example.

We claim:

1. A method of identifying large scale structure and migration pathways of hydrocarbon bearing regions within a subsurface volume, comprising:

(a) obtaining a seismic image of the subsurface volume from seismic reflection traces;

(b) identifying seismic attribute amplitudes associated with the reflection traces which are correlated with the presence of hydrocarbons within the subsurface volume; and (c) establishing the extent of High Amplitude Regions associated with hydrocarbons by region growing seismic attribute data samples within the volume to a preset lower threshold in amplitude.

2. The method of identifying large scale structure and migration pathways according to claim 1, further comprising:

(a) extracting a surface/shell of the High Amplitude Regions following region growth; and (b) mapping the surface/shell of the High Amplitude Regions to aid in visualization of the large scale structure and pathways of areas associated with hydrocarbons within the subsurface volume.

3. The method according to claim 2, further comprising verifying the physical viability of the surface/shell extracted by modelling advection and migration of buoyant fluid within the confines of the surface/shell.

4. The method according to claim 1, wherein the seismic attribute amplitudes are derived by performing complex trace analysis on the seismic traces.

5. The method according to claim 4, wherein the seismic attribute derived is the second reflection strength.

6. The method according to claim 1, wherein the region growing process comprises:

(a) choosing as seed points all high amplitude data samples within the subsurface volume with amplitude above a preset seed threshold value; and (b) growing the High Amplitude Region by including all data samples neighboring the seed points with amplitude above the preset lower threshold, and also including data samples neighboring other included data samples above the preset lower threshold.

7. The method according to claim 6, wherein:

(a) the preset seed threshold is eighty-five percent (85%) of the maximum amplitude found within the subsurface volume; and (b) the preset lower threshold is forty-five percent (45%) of the maximum amplitude found within the subsurface volume.

8. The method according to claim 1, further comprising, applying a smoothing operator to the seismic attribute data samples prior to region growing.

9. The method according to claim 8, wherein the smoothing operator is a median filter which replaces each seismic attribute data sample with the median value of all seismic attribute data samples neighboring each given data sample.

10. A method of identifying small scale structure and regions of dynamic fluid flow within a hydrocarbon reservoir within a subsurface volume, comprising:

(a) obtaining a plurality of seismic images of a subsurface volume from seismic reflection traces, said images being spaced in time to allow for dynamic evolution of the hydrocarbon reservoir within the subsurface volume;

(b) processing the plurality of seismic images such that they are coincident in spatial extent, orientation and resolution;

(c) processing the seismic reflection traces of the plurality of seismic images such that they are matched/normalized in frequency and amplitude distributions;

(d) identifying seismic attribute amplitudes associated with the processed seismic reflection traces which are correlated with the presence of hydrocarbons within the subsurface volume for each seismic image;

(e) establishing for each seismic image the extent of High Amplitude Regions associated with hydrocarbons within the reservoir by region growing the seismic attribute data samples within the reservoir to a preset lower threshold; and (f) identifying intra-reservoir structure by analyzing the differences between the data samples associated with the High Amplitude Region within the reservoir for each seismic image.

11. The method according to claim 10, wherein the intra-reservoir structure identified includes, drainage pathways, regions of bypassed oil, gas-oil-water volumes, and volumes affected by oil production, within High Amplitude Regions.

12. The method according to claim 10, further comprising:

(a) extracting a surface/shell of the High Amplitude Region within the reservoir following region growth; and (b) mapping the surface/shell of the High Amplitude Region to aid in visualization of the outer structure of the High Amplitude Region associated with the presence of hydrocarbons.

13. The method according to claim 10, wherein the seismic attribute amplitudes are derived by performing complex trace analysis on the seismic traces.

14. The method according to claim 13, wherein the seismic attribute derived is the second reflection strength.

15. The method according to claim 10, wherein the region growing process comprises:

(a) choosing as seed points all high amplitude data samples within the reservoir with amplitude above a preset seed threshold value; and (b) growing the High Amplitude Region by including all data samples neighboring the seed points with amplitude above the preset lower threshold, and including data samples neighboring other included data samples above the preset lower threshold.

16. The method according to claim 15, wherein:

(a) the preset seed threshold is eighty-five percent (85%) of the maximum amplitude found within the reservoir; and (b) the preset lower threshold is forty-five percent (45%) of the maximum amplitude found within the reservoir.

17. The method according to claim 10, further comprising applying a smoothing operator to the seismic attribute data samples within the reservoir prior to region growing.

18. The method according to claim 17, wherein the smoothing operator is a median filter which replaces each seismic attribute data sample with the median value of all seismic attribute data samples neighboring each given data sample.

19. The method according to claim 10, further comprising mapping the identified drainage pathways, gas-oil-water volumes and regions of bypassed oil to aid in siting wells for petroleum prospecting.

* * * * *